United States Patent
Czylwik et al.

(10) Patent No.: US 7,324,437 B1
(45) Date of Patent: Jan. 29, 2008

(54) METHOD FOR CO-CHANNEL INTERFERENCE CANCELLATION IN A MULTICARRIER COMMUNICATION SYSTEM

(75) Inventors: Andreas Czylwik, Biblis (DE); Hitoshi Yoshino, Kanagawa (JP)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/130,909

(22) PCT Filed: Nov. 27, 1999

(86) PCT No.: PCT/EP99/09239

§ 371 (c)(1),
(2), (4) Date: Sep. 11, 2002

(87) PCT Pub. No.: WO01/41387

PCT Pub. Date: Jun. 7, 2001

(51) Int. Cl.
*H04B 7/216* (2006.01)
*H04J 11/00* (2006.01)
*H04L 27/00* (2006.01)

(52) U.S. Cl. .............. 370/210; 370/203; 370/335; 375/326

(58) Field of Classification Search ........ 370/203–210, 370/334–347, 442; 375/260–262, 346–348
See application file for complete search history.

(56) References Cited

U.S. PATENT DOCUMENTS

| 4,862,483 | A | 8/1989 | Clark | |
|---|---|---|---|---|
| 5,537,443 | A | 7/1996 | Yoshino et al. | 375/340 |
| 5,867,478 | A | 2/1999 | Baum et al. | 370/203 |
| 5,973,642 | A | 10/1999 | Li et al. | 342/378 |
| 6,249,518 | B1 * | 6/2001 | Cui | 370/347 |
| 6,269,133 | B1 * | 7/2001 | Lee | 375/350 |
| 6,549,581 | B1 * | 4/2003 | Izumi | 375/260 |
| 6,603,734 | B1 * | 8/2003 | Oksanen | 370/203 |
| 6,680,901 | B1 * | 1/2004 | Yamamoto et al. | 370/208 |
| 6,795,424 | B1 * | 9/2004 | Kapoor et al. | 370/343 |
| 7,039,137 | B1 * | 5/2006 | Lauterjung et al. | 375/349 |
| 2002/0191535 | A1 * | 12/2002 | Sugiyama et al. | 370/208 |

OTHER PUBLICATIONS

M. Münster et al. "Co-Channel Interference Suppression Assisted Adaptive OFDM in Interference Limited Environments" 1999; pp. 284-288; in VTC 1999.

W. Van Etten, "Maximum Likelihood Receiver for Multiple Channel Transmission Systems", IEE Transactions on Communications, Feb. 1976, pp. 276-283.

Howard E. Nichols, Arthur A. Giordano, John G. Proakis, MLD and mse Algorithms for Adaptive Detection of Digital Signals in the Presence of Interchannel Interference, IEE Transactions on Information Theory, vol. IT-23, No. 5, Sep. 1977, pp. 563-575.

(Continued)

Primary Examiner—Man U. Phan
(74) Attorney, Agent, or Firm—Darby & Darby

(57) ABSTRACT

A method for cancelling co-channel interference in a multi-carrier communication system includes receiving a serial baseband multi-carrier signal including at least one desired signal and at least one interference signal over at least one receiving branch, and converting the received multi-carrier signal into a plurality of baseband sub-carrier signals. Co-channel interference in each sub-carrier signal is cancelled by subtracting an estimated desired received sub-carrier signal and an estimated interference sub-carrier signal from a received sub-carrier signal. The sub-carrier signals are converted to a multi-carrier output signal comprising the desired signal.

25 Claims, 15 Drawing Sheets

OTHER PUBLICATIONS

A. P. Clark, J.D. Harvey, J.P. Driscoll, Near-maximum-likelihood detection processes for distorted digital signals, The Radio and Electronic Engineer, vol. 48, No. 6, pp. 301-309, Jun. 1978.

S. B. Weinstein, "Data Transmission by Frequency-Division Multiplexing Using the Discrete Fourier Transform", IEEE Transactions on Communication Technology, vol. COM-19, No. 5, Oct. 1971, pp. 628-634.

* cited by examiner

METHOD FOR CO-CHANNEL INTERFERENCE CANCELLATION IN A MULTICARRIER COMMUNICATION SYSTEM

CROSS-REFERENCE TO RELATED APPLICATIONS

This application is a U.S. National Stage Application under 35 U.S.C. §371 of PCT International Application No. PCT/EP99/09239, filed Nov. 27, 1999, which is incorporated herein by reference as if set forth in its entirety.

BACKGROUND

The present invention relates to an interference signal canceling method, a receiver using the same and a digital multi-carrier communication system comprising such a receiver. More particularly, it relates to an interference signal canceling method which compensates the transmission performance degradation due to co-channel or similar interference signals from other adjacent cells in digital mobile radio communication or other adjacent transmitter in digital wireless communication or in digital broadcasting system and a receiver and a communication system using such an interference signal canceling method.

There have already been proposed several types of receivers which employ replica generators for interference canceling. They generate replicas by using transmission symbol candidates both for desired and interference signals, and transmission channel parameters corresponding to these two signals. Then, they subtract these replicas from a received signal to obtain an error signal. They multiply the square of the error signal by −1 and use the resulting signal as a metric for a maximum likelihood sequence estimation (MLSE) both for desired and inter-channel interference signals under inter-symbol interference condition.

For example, W. Van Etten has proposed a receiver using the Viterbi algorithm as a maximum likelihood sequence estimator (W. Van Etten, "Maximum Likelihood Receiver for Multiple Channel Transmission System," IEEE Trans. on Comm. February 1976). However, this receiver is based on the assumption that the channel impulse response values are preknown. A receiver that estimates channel parameters and employs a maximum likelihood sequence estimation has been proposed by Howard E. Nicols, Arithur A. Giordano and John G. Proakis (H. E. Nichols, A. A. Giordano, and J. G. Proakis, "MLD and MSE algorithm for adaptive detection of digital signals in the presence of interchannel interference," IEEE Trans. on Information Theory, September 1977). According to their proposal, the channel parameters are estimated and updated by an adaptation algorithm by using an estimated symbol value which is output from the maximum likelihood sequence estimator with a decision delay of several symbol duration. This receiver operates well when the radio channel has relatively slow time-variations. In the mobile radio channel, however, since the amplitudes and phases of desired and interference signals vary very rapidly, the estimated channel parameters with the time delay of several symbol duration represent no longer the current channel impulse response. Hence, the transmission performance is seriously degraded.

To improve the transmission performance of a receiver based on the maximum likelihood sequence estimation scheme, A. P. Clark, J. D. Harvey and J. P. Driscoll have proposed a Near-Maximum-Likelihood detection scheme as a solution to the poor channel parameter estimation due to the fixed estimation delay which poses a serious problem in the adaptive maximum likelihood sequence estimation receiver (A. P. Clark, J. D. Harvey and J. P. Driscoll, "Near-Maximum-Likelihood detection processes for distorted digital signals," Radio & Electronics Engineer, Vol. 48, No. 6, pp. 301–309, June 1978).

Moreover, A. P. Clark has proposed an FDM (Frequency Division Multiplexing) system that transmits two signals over the same frequency channel through utilization of the Near-Maximum-Likelihood detection scheme (U.S. Pat. No. 4,862,483). In this system, however, the number of the transmission signal sequence candidates (first vector) to be stored in a memory and the number of the sets of transmission channel parameters (vectors) corresponding to the first vector are large. Each first vector is extended into a second vector by adding a further component representing a respective combination of data symbols that could be received at the sample instant. New signal sequence candidates (first vectors) are selected among the extended signal sequence candidates (i.e. second vectors) in a highest likelihood order. When the likelihood of the transmission signal sequence candidate (first vector) who has the highest likelihood is extremely higher than that of the other signal sequence candidates (first vectors), the likelihood order of the extended sequence candidates (second vectors) depends dominantly on the likelihood value of the first vector. Hence, there is almost no possibility of other first vectors being selected. This receiver can no longer be considered as a maximum likelihood detector.

H. Yoshino, K. Fukawa and H. Suzuki have proposed, as an interference signal canceling method, a receiver using a transmission parameter estimation scheme suitable for the maximum likelihood sequence estimation which keeps high-speed, precise track of the fast fading or fast changing mobile radio channel (U.S. Pat. No. 5,537,443). An interference canceller of this scheme cancels both inter-symbol interference and co-channel interference, but the number of the states in the Viterbi algorithm increases exponentially as the maximum excess delay caused by multi-path propagation increases. When the signal delay exceeds the maximum signal delay considered in the Viterbi algorithm, the maximum likelihood sequence estimator does not work, and the transmission performance is seriously degraded.

On the other hand, S. B. Weinstein and P. M. Ebert have proposed a modulation and demodulation scheme to overcome the effect of the inter-symbol interference which is denoted orthogonal frequency division multiplexing (OFDM) and uses the discrete Fourier transform (S. B. Weinstein and P. M. Ebert, "Data transmission by frequency division multiplexing using the discrete Fourier transform," IEEE Trans. on Comm., October 1971). A receiver of this scheme does not cancel co-channel interference, and hence possesses the drawback that it does not operate in a high co-channel interference environment.

A description will be given first, with reference to FIG. 1A and FIG. 1B, of a conventional scheme of the orthogonal frequency division multiplexing (OFDM) data transmission that has the above-said feature of avoiding the intersymbol interference. FIG. 1A shows the transmitter scheme for an OFDM data transmission system. This transmitter is made up of: a serial to parallel (S/P) converter 1 which converts serial data stream to a set of L parallel data streams; parallel baseband modulators 2 to which the data in each sub-channel are fed; an inverse discrete Fourier transform (IDFT) device 3, whose outputs correspond to L channel transmitted signals with carrier frequencies $f_0, f_1, \ldots, f_{L-1}$, where the frequency difference between adjacent channels is Df and the overall bandwidth W of the L modulated carriers is L Df; a cyclic extension device 4 which adds a cyclic prefix (guard interval) in order to avoid the effect caused by inter-block interference; a parallel to serial converter (P/S) 5 to output time domain signal; a digital-to-analog (D/A) converter 6 which converts digital signal to an analog waveform; and a low pass filter 7 which limits the frequency spectrum.

FIG. 1B shows the receiver scheme for an OFDM data transmission system. This receiver is made up of a low pass filter 10 which band-limits the received signal; an analog-to-digital (A/D) converter 11 which converts the analog received signal to digital form; a serial-to-parallel (S/P) converter 12 which converts the serial received signal to L parallel data streams; a remove cyclic extension device 13 which removes the cyclic prefix in order to remove the effect of time domain inter-symbol interference; a discrete Fourier transform (DFT) device 14 whose output are L sub-carrier channels; L baseband demodulators 15 which demodulate baseband received symbols to digital data bits; and a parallel-to-serial (P/S) converter 16 which recombines digital data bits to a serial data bit sequence. An advantage of the OFDM data transmission system is that OFDM reduces the effects of intersymbol interference (ISI) by lowering the symbol rate for each sub-carrier. Particularly, for the application of high bit rate digital signal transmission, OFDM also can eliminate the effect of ISI by adding a cyclic prefix, the length of which is set to be greater than the maximum excess delay of the transmission channel. When the received signal contains an interference signal from another transmitter, the interference signal still remains on each of the sub-channels so that the transmission performance is seriously degraded. In a cellular mobile communication system in which each cell may sometimes receive a co-channel interference signal from an adjacent cell, or in wireless local or wide area network in which the same frequency channel is reused (e.g. space division multiple access (SDMA) systems), there is a strong demand for canceling the influence of the interference. In a digital broadcasting system, such as digital audio broadcasting (DAB) or digital video broadcasting (DVB), the receiver at the fringe of a broadcasting service area suffers a co-channel interference from the transmitter in an adjacent broadcasting service area if in both service areas the same frequency channels are used. Thus, there is also a strong demand for canceling the interference signal.

SUMMARY OF THE INVENTION

An object of the present invention is to provide a multi-carrier receiver, e.g. an OFDM receiver, a digital signal transmission multi-carrier communication system and a method for canceling co-channel interference in a multi-carrier signal which use a less complex and thus a cheaper interference cancellation scheme than the prior art according to U.S. Pat. No. 5,537,443.

An aspect of the present invention is to apply the above mentioned interference cancellation scheme to a digital multi-carrier communication system. The present invention applies the above mentioned transmission channel parameter estimation scheme and co-channel interference cancellation scheme to an above mentioned frequency division multiplexing system. By using a digital multi-carrier communication system, e.g. an OFDM system, the effect of the inter-symbol interference is avoided. As a result an interference canceller which only cancels co-channel interference is used for each sub-carrier signal. By exploiting the different channel characteristics, say, the difference in amplitudes and phases between desired and interference signals, the transmitted symbol sequences can be simultaneously estimated both for the desired and the interference signals.

The present invention provides a receiver for use in a digital multi-carrier communication system. The receiver includes at least one receiving branch, each receiving branch including a demodulating device for converting a received serial multi-carrier signal into a plurality of sub-carrier signals, the received serial multi-carrier signal including at least one desired and at least one interference signal. Also included are a plurality of interference cancellers each associated with a respective one of the sub-carrier signals and configured for subtracting an estimated desired received sub-carrier signal and an estimated interference sub-carrier signal from a received sub-carrier signal so as to cancel co-channel interference.

The present invention also provides a digital multi-carrier communication system comprising a plurality of transmitters and a plurality of receivers, each of the receivers including at least one receiving branch, each receiving branch including a demodulating device for converting a received serial multi-carrier signal into a plurality of sub-carrier signals, the received serial multi-carrier signal including at least one desired and at least one interference signal. Also included are a plurality of interference cancellers each associated with a respective one of the sub-carrier signals and configured for subtracting an estimated desired received sub-carrier signal and an estimated interference sub-carrier signal from a received sub-carrier signal so as to cancel co-channel interference.

The present invention also provides a method for cancelling interference signals in a multi-carrier signal arrived at a receiver, the method comprising the steps:

receiving a serial baseband multi-carrier signal including at least one desired signal and at least one interference signal over at least one receiving branch;

converting the received multi-carrier signal into a plurality of baseband sub-carrier signals;

cancelling co-channel interference in each sub-carrier signal by subtracting an estimated desired received sub-carrier signal and an estimated interference sub-carrier signal from a received sub-carrier signal; and converting the sub-carrier signals to a multi-carrier output signal comprising the desired signal.

The receiver comprises at least one receiving branch, wherein each receiving branch comprises a demodulating device for converting a received serial multi-carrier signal including at least one desired and interference signal into a plurality of sub-carrier signals, and a plurality of interference cancellers each of which is associated to a respective one of said sub-carrier signals for canceling co-channel interference.

In a preferred embodiment each interference canceller comprises a transmitted symbol estimation part connected to a metric generator for applying a set of symbol candidates both for the at least desired and interference signals to the metric generator and for receiving metric values generated by the metric generator by using a received sub-carrier signal and said set of symbol candidates, wherein said transmitted symbol estimation part (40) determines the most likely set of symbol candidates by using the metric values.

In a preferred embodiment the metric generator comprises a channel parameter estimation part for estimating signal transmission channel parameters both of the at least one desired and interference signals by using the set of the desired and the interference signal symbol candidates provided by said transmitted symbol estimation part and an estimation error signal provided by an error estimation part, a replica generator for generating a replica signal from both of the desired and the interference signals by using the set of the desired and the interference signal symbol candidates and the desired and the interference signal channel parameters provided by said channel parameter estimation part, wherein the error estimation part generates the estimation error signal by using said received sub-carrier signal and the replica signal and a metric calculator connected to the transmitted symbol estimation part for generating metric values from the estimation error signal.

The replica generator of each metric generator may comprise a desired signal estimation part for generating the replica of the desired signal by using the channel parameter of the desired signal and a desired signal symbol candidate provided by the transmitted symbol estimation part, at least one interference signal estimation part each for generating a replica of a respective interference signal by using the interference signal transmission channel parameters and interference signal symbol candidates provided by the transmitted symbol estimation part, a replica combining adder for combining the generated replicas of the desired and interference signals and outputting the combined replica to the error estimation part.

The transmitted symbol estimation part may comprise a first modulation signal generator for generating desired signal complex modulation symbols, at least one second modulation signal generator for generating interference signal complex modulation symbols. The replica generator of each metric generator comprises a first complex multiplier for multiplying the output signal of the first modulation signal generator with the desired signal transmission channel parameter generated by the channel parameter estimation part, at least one second complex multiplier for multiplying the output signal of the respective second modulation signal generator with the respective interference signal transmission channel parameter generated by the channel parameter estimation part, a replica combining adder connected to said first and at least one second multiplier for summing the desired and interference signal replicas.

The transmitted symbol estimation part may further comprise a first training sequence memory unit for storing a desired signal training bit sequence and for generating a set of training bits, at least one second training sequence memory unit each of which stores an interference signal training bit sequence and each of which generates a set of training bits of a corresponding interference signal, a maximum likelihood estimator, a first switch for connecting the first training sequence memory unit during a training period and a respective output of the maximum likelihood estimator during a tracking period to the first modulation signal generator, at least a second switch for connecting the respective second training sequence memory unit during a training period and a respective output of the maximum likelihood estimator during a tracking period to the respective second modulation signal generator.

In a preferred embodiment the channel parameter estimation part comprises a channel estimator having inputs connected to the first and second modulation signal generators and to the error estimation part and outputs connected to the first and second complex multiplier estimating and/or updating said desired and interference transmission channel parameters by using an adaptation algorithm.

In an alternative embodiment the channel parameter estimation part comprises a channel estimator having inputs connected to the first and second modulation signal generators and to a switch and outputs connected to the first and second complex multiplier, wherein the switch controllable supplies the received sub-carrier signal which is also applied to the error estimation part or the error signal generated by the error estimation part to the channel estimator.

The metric calculator may comprise an absolute-square circuit for calculating an absolute-squared value of the applied error signal.

The error estimation part may comprise a subtractor for subtracting said replica signal provided by the replica combining adder from said respectively received sub-carrier signal to generate said estimation error signal.

In an alternative embodiment the receiver is a multi-branch diversity receiver comprising a plurality of interference cancellers, each of which comprises a transmitted symbol estimation part connected to a number of metric generators for applying a set of symbol candidates both for the desired and interference signals to the metric generators, wherein the number of metric generators corresponds to the number of receiving branches, wherein each metric generator generates metric values by using a respective received sub-carrier signal of a different diversity branch and said set of symbol candidates, and a diversity combiner connected to the metric generators for combining the metric values received from the metric generators, wherein said transmitted symbol estimation part determines the most likely set of symbol candidates both for the desired and interference signals to be transmitted by using the metric values received from the diversity combiner.

In an alternative embodiment the diversity combiner comprises a branch combining weight controller which receives a respective received sub-carrier signal on each receiving branch for computing combining weight-coefficients and outputting said weight-coefficients, a plurality of multipliers each connected to a respective metric generator, a diversity combining adder having inputs connected to the multipliers and an output connected to the transmitted symbol estimation part.

In particular, the receiver subtracts an estimated desired received sub-carrier signal and an estimated interference sub-carrier signal from a received sub-carrier signal and gets an error signal. The receiver determines transmitted signal symbol sequence both of desired and the interference signal with the error signal by using a maximum likelihood estimation device. The error signal can also be used for channel parameter estimation by using adaptation algorithms. In this receiver, both the desired and multiple of interference signals are estimated so as to minimize the estimation error signal. Hence, the receiver provides an excellent signal transmission performance even under a strong interference signal co-existence condition. This receiver can easily be extended to a multi-user receiver by outputting the estimated symbol sequences not only of the desired signal but also of the interference signals.

According to the present invention, a desired signal candidate which corresponds to one of the possible desired signal symbols to be transmitted and the interference signal candidates which correspond to one of the possible signal symbols of the interference signals to be transmitted from other stations are generated in a maximum likelihood estimator. These candidates are fed to a part to generate estimated desired and interference signals (called replica signals thereafter). The desired and interference replica signals are subtracted in an error estimation part from the received signal to compute estimation error signal. The error signals are calculated for every set of desired and interference candidates. The maximum likelihood estimator selects the set of the desired signal and interference signals which has the highest likelihood metric (least estimation error). A channel parameter estimation part determines or updates the transmission channel parameters by using an adaptation algorithm so as to minimize the estimation error signal.

For the correct set of desired and interference signal symbols, both the desired signal and the interference signal components are removed, and hence the major component in the estimation error signal becomes noise and channel estimation error components. Consequently, the maximum likelihood estimation on each sub-channel is free from the influence of the interference signal. Thus, it is possible to provide an excellent receiving performance unaffected by the interference signal even if the received signal contains interference signals. According to the present invention, the desired and interference signals are treated in the same manner in terms of signal processing. Thus, this invention can be easily extended to a multi-user detection receiver if both the desired and the interference signal information sequences are output in the maximum likelihood estimator.

BRIEF DESCRIPTION OF THE DRAWINGS

The features of this invention are set forth in the appended claims. The invention, together with its objects and the advantages thereof, may be best understood by reference to the following description taken in conjunction with the accompanying drawings, in which like references numerals identify like elements in the figures and in which:

DETAILED DESCRIPTION

A digital signal transmission multi-carrier scheme, such as an orthogonal frequency division multiplexing scheme, called OFDM scheme, reduces the effects of inter-symbol or inter-block interference by making the block period much larger than the delay spread of the radio channel. Even when the delay spread becomes relatively large compared with the length of the OFDM block period, the use of a cyclic prefix preserves the orthogonality of the each sub-carrier channels and eliminates inter-symbol interference (ISI) or inter-block interference (IBI) between consecutive OFDM symbols. Thus, it is a great advantage for high bit rate digital signal transmissions to employ an OFDM scheme. In case of a conventional single carrier per channel (SCPC) transmission system, when the channel impulse response extends over many symbols, the number of states to be defined in a maximum likelihood sequence estimator becomes large. The number of states increases exponentially as the excess delay normalized by symbol duration increases. In case of the interference signal canceller for single carrier per channel transmission system, the number of state to be considered in a maximum likelihood sequence estimator becomes huge. Applying an OFDM scheme to a maximum likelihood sequence estimation (MLSE) receiver is very promising and effective because the OFDM scheme reduces the number of states to be considered in the MLSE receiver. By employing an OFDM scheme, the MLSE can be reduced in terms of the number of the state to be a simple maximum likelihood estimator (MLE). There is no need to perform the sequence estimation.

Figure 1A:
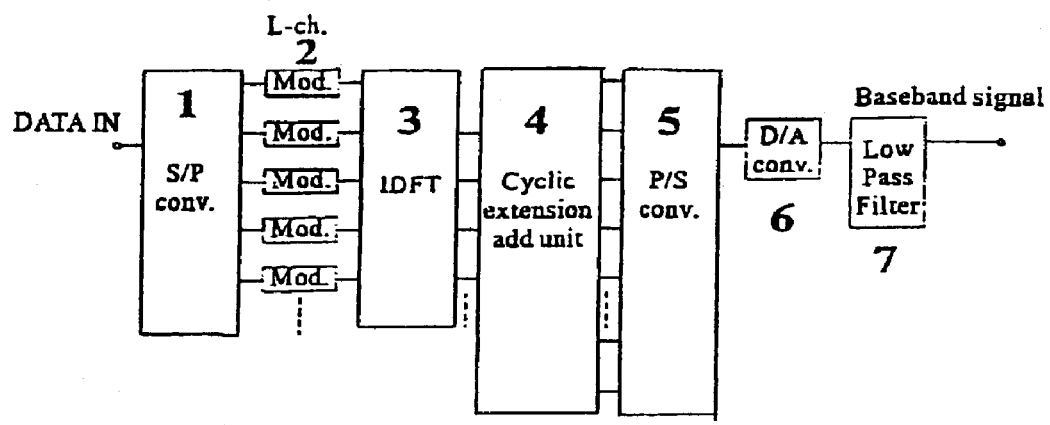
FIG. 1A is a block diagram of a conventional transmitter using an inverse discrete Fourier transform (IDFT) in an OFDM transmission system.
Figure 1B:
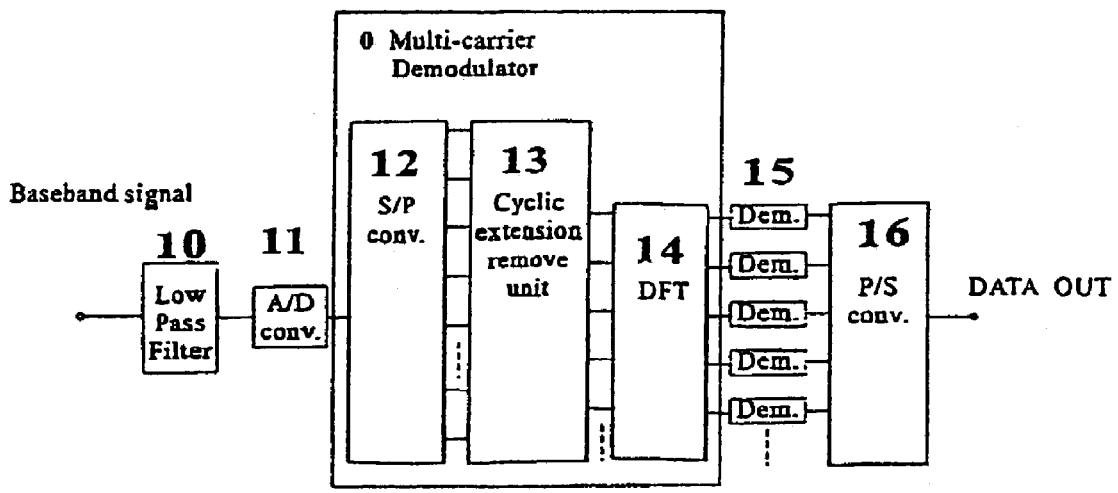
FIG. 1B is a block diagram of a conventional receiver using a discrete Fourier transform (DFT) in an OFDM transmission system.
Figure 2A:
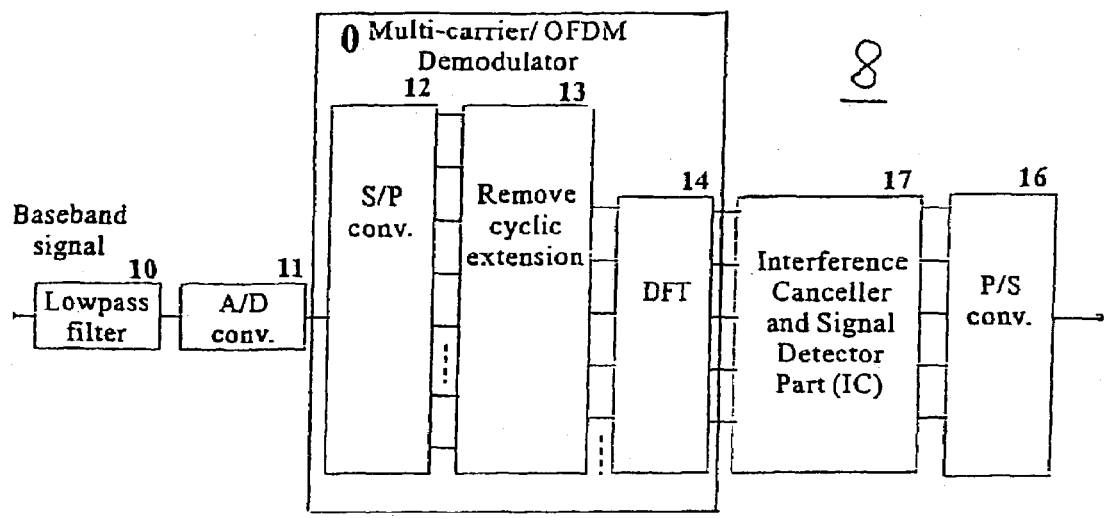
FIG. 2A is a block diagram of an OFDM receiver using an interference canceller illustrating conceptual construction of the present invention.
Figure 2B:
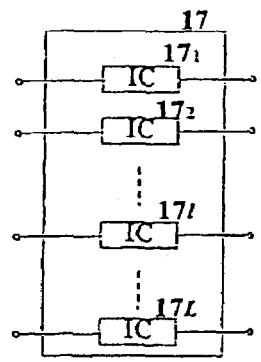
FIG. 2B is a block diagram of a parallel configuration of interference cancellers illustrating conceptual construction of the present invention.

FIG. 2A and FIG. 2B illustrate in block diagrams the conceptual configuration of a first embodiment of a receiver 8 according to the present invention for use in a digital multi-carrier communication system such as an OFDM-system. This receiver 8, as compared with the prior art receiver of FIG. 1B, may also comprise a low pass filter 10, an analog-to digital converter 11, a serial-to-parallel converter 12, a remove cyclic extension device 13, a discrete Fourier transform device 14, baseband demodulators and a parallel-to-serial converter 16. In contrast to the prior art receiver which only avoids inter-symbol interferences the receiver 8 according to the present invention features a configuration wherein an interference signal canceller and signal detector part (IC) 17 is connected between the discrete Fourier transform device 14 the and parallel-to-serial converter 16. The interference signal canceller and signal detector part (IC) 17 cancels co-channel interference signals on each sub-carrier channel by generating replica signals both of the desired and interference signals. The interference signal canceller and signal detector part (IC) 17 reduces the interference and demodulates the desired signal. The outputs of the interference signal canceller and signal detector part (IC) 17 are parallel received data bit streams. The Parallel-to-Serial (P/S) converter 16 converts the parallel received data bit streams into a serial receive data bit stream.

FIG. 2B is a block diagram illustrating a concrete configuration of the embodiment of the interference canceller and signal detector part (IC) 17 in FIG. 2A. The FIG. 2B embodiment is made up of a plurality of interference cancellers (IC) $17_1$, $17_2$, $17_3$, . . . , $17_L$, each of which is associated to a respective sub-carrier channel.

Figure 2C:
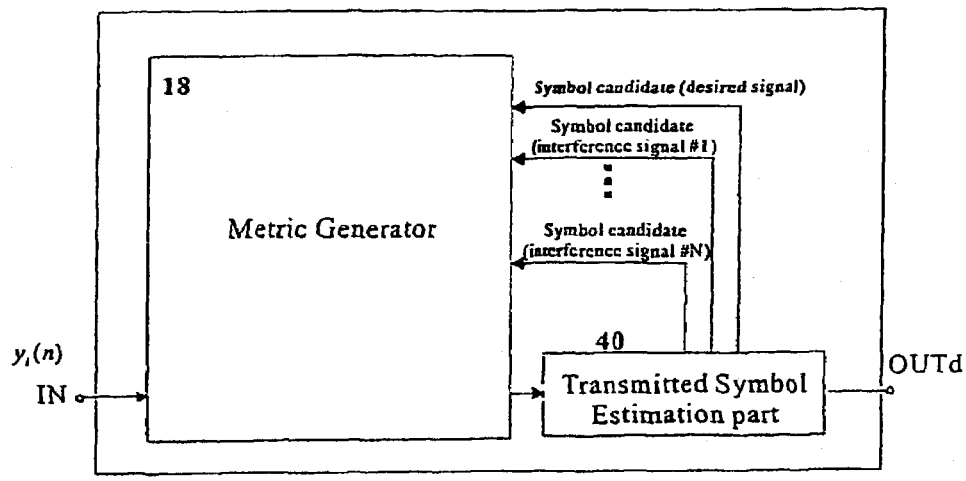
FIG. 2C is a block diagram of an interference canceller using a metric generator illustrating conceptual construction of the present invention.

FIG. 2C illustrates a concrete configuration of the interference cancellers (IC) 17 shown in FIG. 2B for the l-th sub-carrier channel, where $1 \leq l \leq L$ and L is a number of sub-carriers. In FIG. 2C, the l-th interference canceller 17l is explained as an example. A transmitted symbol estimation part 40 provides a metric generator 18 with a plurality of transmitted symbol candidates. The metric generator 18 calculates metric values by using a received signal value $y_l(n)$ at the terminal IN and the transmitted symbol candidates and outputs the metric values which correspond to each combination of the transmitted symbol candidates provided by transmitted symbol estimation part 40. The transmitted symbol estimation part 40 selects the most likely combination set of the transmitted symbol candidates by using the metric values provided by the metric generator 18, and outputs the most likely combination set of the transmitted symbol candidates to the terminal OUTd.

Figure 3:
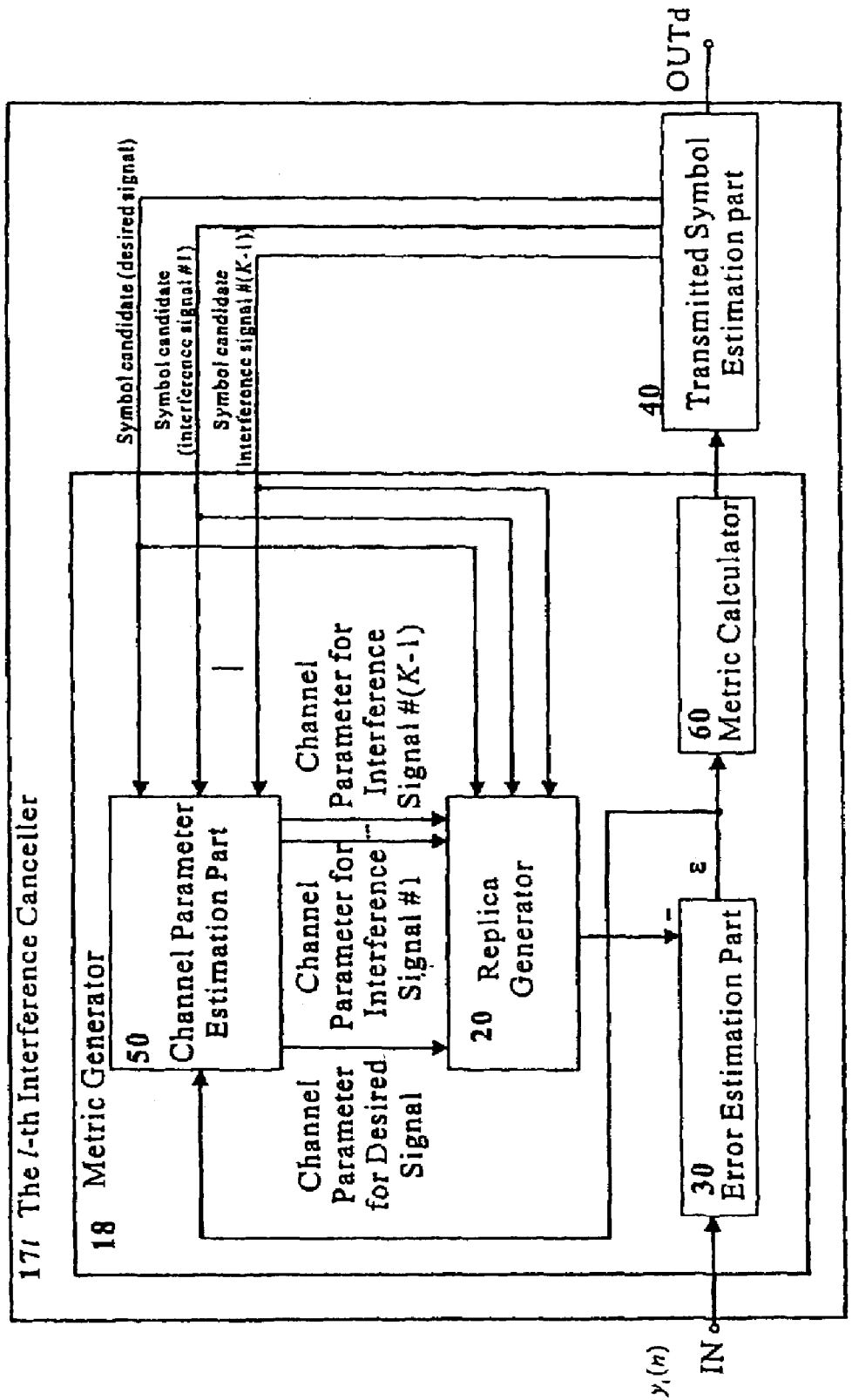
FIG. 3 is a block diagram of an interference canceller illustrating a conceptual block of a replica generation type of the present invention.

FIG. 3 shows in detail the metric generator 18 of the l-th interference canceller 17l shown in FIG. 2C. In FIG. 3, the metric generator 18 consists of a channel estimator 50, a replica generator 20, an error estimation part 30 and a metric calculator 60. In the channel estimator 50, the channel parameter set, e.g., channel impulse response both for the desired and interference signals are stored. The channel parameter set is fed to the replica generator 20. The replica generator 20 generates a replica signal of the received signals, which are the transmitted signals corrupted by transmission channel distortions such as fading and interference signals, e.g., co-channel signal which also corrupted by the interference signal transmission channel distortion such as fading. The error estimation part 30 calculates error signal ϵ by using the above mentioned replica signal and the received signal at the terminal IN. The error signal e is used for the update of the channel parameters in the channel parameter estimator 50. The error signal e is also fed to the metric calculator 60. The metric calculator 60 calculates the branch metric value. The branch metric value is fed to the transmitted symbol estimation part 40. The transmitted symbol estimation part 40 provides the set of the symbol candidates to the replica generator 20 and gets the branch metric value which corresponds to the provided set of the symbol candidates, from the metric calculator 60, as a result. Then, the transmitted symbol estimation part 40 determines the most likely combination set of the candidate to be transmitted both at the desired and the interference signal transmitters. The channel parameter estimation part 50 received the most likely set of the candidate to be transmitted and updates the channel parameters both for the desired and the interference signals by using the estimation error signal ϵ which corresponds to the most likely set of the candidate to be transmitted. In updating channel parameters, the channel parameter estimation part 50 may employ an adaptation algorithm such as Recursive Least Squares (RLS) or Least Mean Square (LMS) algorithms. The present invention may consider co-channel interference signals as the above mentioned interference signals in a cellular or personal communication system (PCS) radio communication systems or digital audio broadcasting (DAB) and digital video broadcasting (DVB) systems. In these environments, fast channel adaptation such as RLS or LMS algorithm would be required to track the fast-time-varying channel parameters. The channel parameter estimation part 50 provides the updated channel parameters to the replica generator 20 for the next replica generation.

Figure 4:
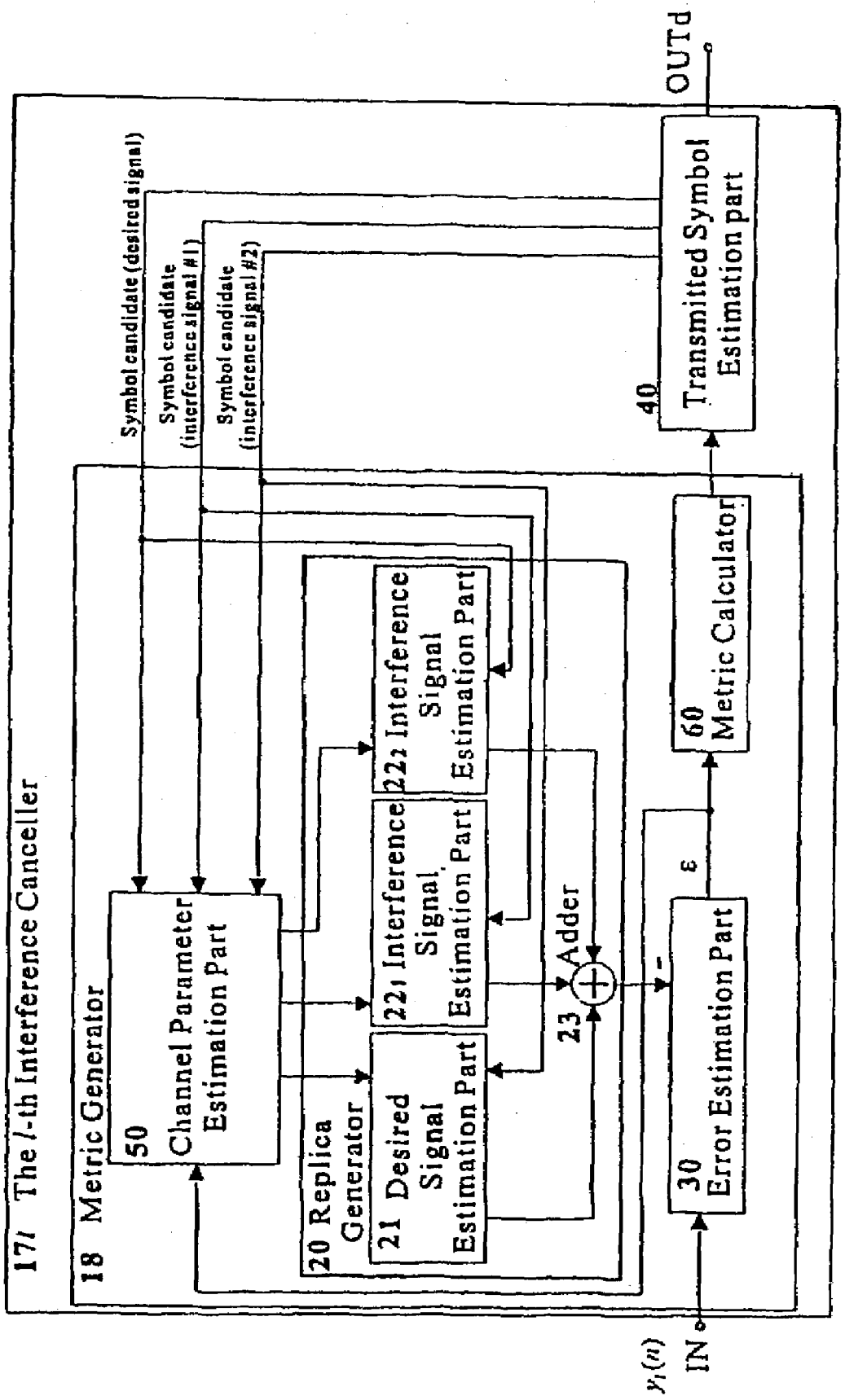
FIG. 4 is a block diagram of an interference canceller illustrating a replica generation type of the present invention.

FIG. 4 shows an embodiment of the replica generator 20 of the interference canceller 17l. In this embodiment, as an example, the replica generator 20 consists of one desired signal estimation part 21 and two interference signal estimation parts $22_1$ and $22_2$. But this scheme can be easily extended to the case where there are more than one desired and more than two interference signals. The channel parameter set is divided into the channel parameters of the desired and the interference signals. Each channel parameter is fed to the corresponding signal estimation part 21, $22_1$ and $22_2$, respectively, in the replica generator 20. The desired signal estimation part 21 generates the replica signal of the desired signal, which is corrupted by the desired signal transmission channel distortion such as fading, by using the desired signal estimated channel parameter and the desired signal symbol candidate. The interference signal estimation part $22_1$ generates the replica signal of the first interference signal, called the interference signal #1 thereafter, by using the interference signal #1 estimated channel parameter and the interference signal #1 symbol candidate. The above mentioned interference signal #1 replica is corrupted by the interference signal #1 transmission channel distortion such as fading. The interference signal estimation part $22_2$ generates the replica signal of the second interference signal, called the interference signal #2 thereafter, by using the interference signal #2 estimated channel parameter and the interference signal #2 symbol candidate. The above mentioned interference signal #2 replica is also corrupted by the interference signal #2 transmission channel distortion such as fading. In case of the multiple interference signals more than 2, the interference signal estimation part can be added to the replica generator 20, and the channel estimator 50 and the transmitted symbol estimation part 40 can also be easily extended. The replica signals, e.g., from 21, $22_1$ and $22_2$, are summed up together in a replica combining adder 23 to be the replica signal of the received signal. The above mentioned replica signal contains the desired signal, the interference signals #1 and #2, all of which are corrupted by the corresponding transmission channel fading effects.

Figure 5A:
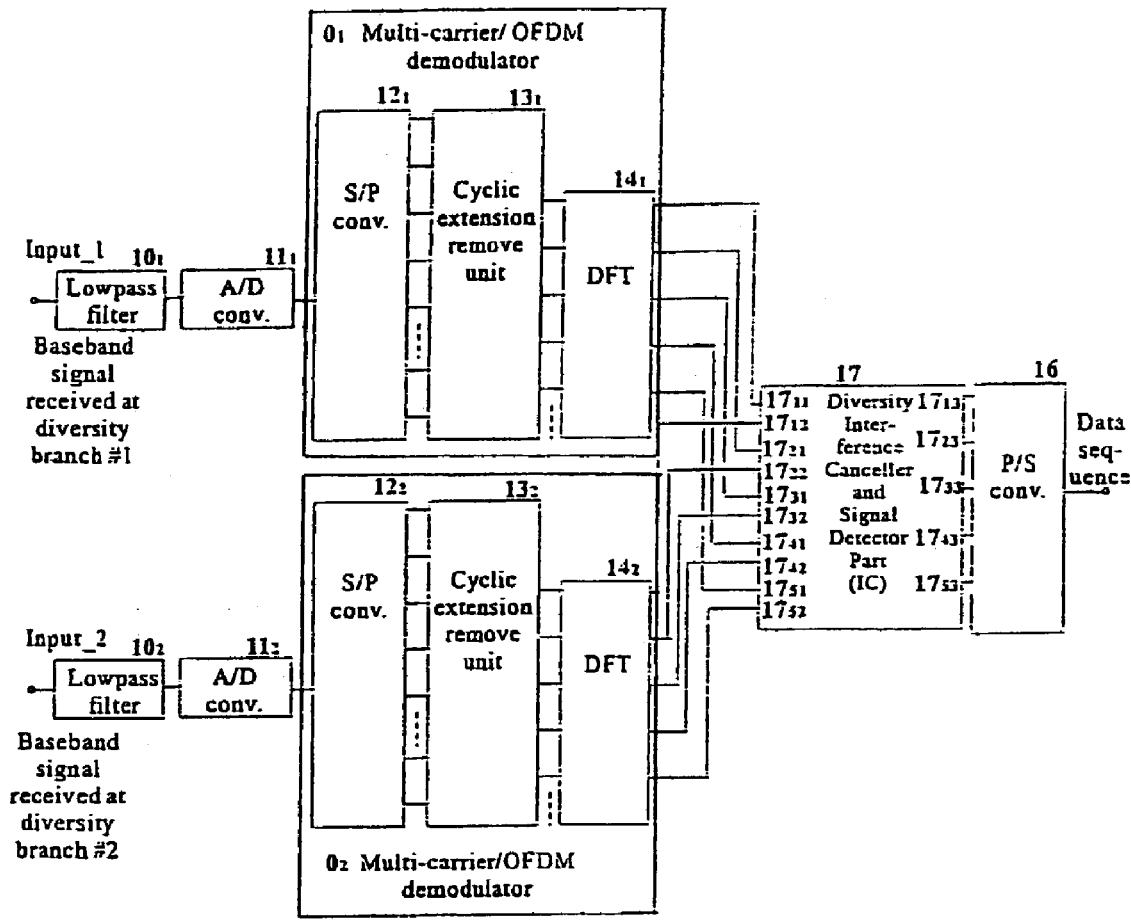
FIG. 5A is a block diagram of an OFDM two-branch diversity receiver using an interference canceller illustrating conceptual construction of the present invention.

FIG. 5A is a block diagram illustrating a concrete configuration of a two-branch diversity receiver. This block diagram illustrates only two-branch diversity reception scheme, but this scheme can be easily extended to the scheme that has more than two diversity branches. The received baseband signal that corresponds to a diversity branch, say diversity branch #1, is filtered with the low pass filter $10_1$. This low pass filter $10_1$ can be a matched filter that corresponds to the transmitter filter in the transmitter. One example of this filter is a typical raised cosine root roll off filter. The output of the low pass filter $10_1$ is fed to an analog-to-digital (A/D) converter $11_1$. The output of the analog-to-digital converter $11_1$ is fed to a serial-to-parallel (S/P) converter $12_1$ to get a block of received signal samples which belong to the same OFDM symbol time duration; i.e. OFDM symbol block. A cyclic extension remove unit $13_1$ removes a cyclic prefix to alleviate the effect of inter-block interference (IBI). A discrete Fourier Transform (DFT) unit $14_1$ transforms a block of received time-domain signal to received complex symbols corresponding to each sub-carrier channels. At the diversity branch #2, the received baseband signal is filtered with the low pass filter $10_2$. The output of the low pass filter is fed to the A/D converter $11_2$. The sampled baseband signal is converted into a block of received data samples by S/P converter $12_2$. A cyclic extension remove unit $13_2$ removes the cyclic prefix and a DFT unit $14_2$ transforms a block of time-domain received signal into received complex symbols on each sub-carrier channel. In the interference canceller and signal detector part 17, these received complex symbols are combined together on a sub-channel by sub-channel basis. The outputs of the interference signal canceller and signal detector part (IC) 17 are parallel received data bit streams. A Parallel-to-Serial (P/S) converter 16 converts the parallel received data bit streams into a serial receive data bit stream.

Figure 5B:
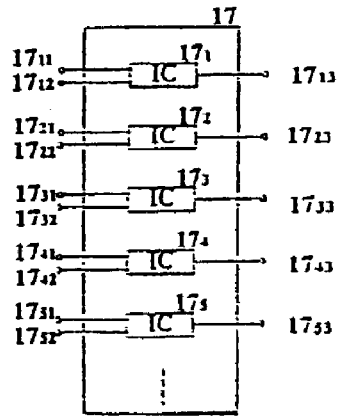
FIG. 5B is a block diagram of a parallel configuration of two-branch diversity interference cancellers illustrating conceptual construction of the present invention.

FIG. 5B illustrates a block diagram of parallel configuration of the interference canceller and detector part 17. In this embodiment, diversity combining is performed sub-channel by sub-channel. There are L independent interference cancellers $17_1 \ldots 17_L$ in the interference canceller part 17, where L is the number of the sub-carriers.

Figure 5C:
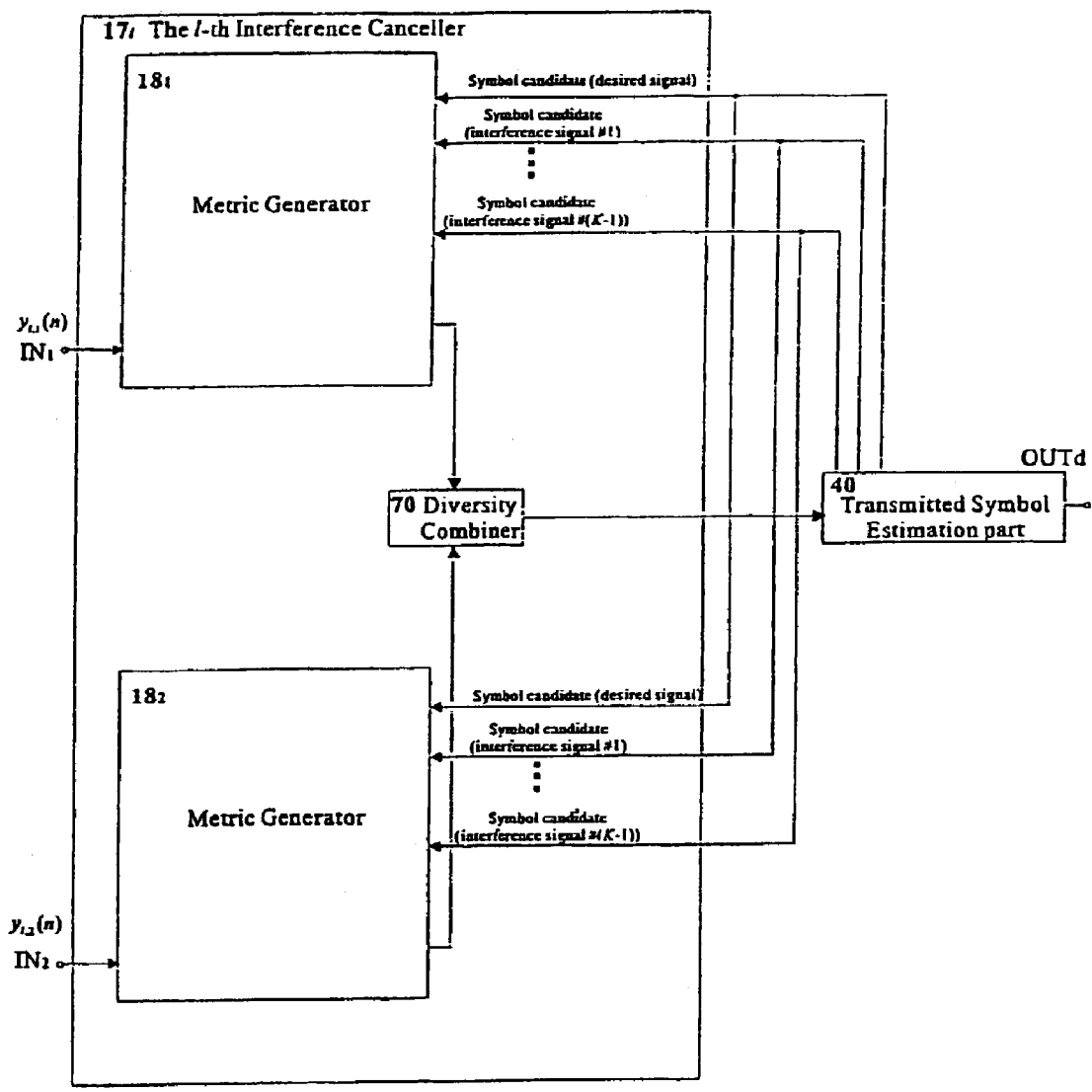
FIG. 5C is a block diagram of an OFDM two-branch diversity receiver using an interference canceller with metric generators illustrating conceptual construction of the present invention.

FIG. 5C illustrates a block diagram of the l-th interference canceller $17_1$ of the interference canceller part 17 shown in FIG. 5B, which employs two metric generators $18_1$, $18_2$ and a diversity combiner 70 for the diversity reception. A transmitted symbol estimation part 40 generates a plural set of the desired and interference signal candidates and provides the set to the metric generators $18_1$ and $18_2$. The metric generator $18_1$ calculates metric values by using the l-th sub-channel received signal values $y_{l,1}(n)$ at the diversity branch #1 at the terminal IN1 and the transmitted symbol candidates provided by the transmitted symbol estimation part 40, and outputs the metric values which correspond to each combination set of the transmitted symbol candidates provided by transmitted symbol estimation part 40. The metric generator $18_2$ calculates metric values by using the l-th sub-channel received signal values $y_{l,2}(n)$ at the diversity branch #2 at the terminal IN2 and the above mentioned transmitted symbol candidates provided by the transmitted symbol estimation part 40, and outputs the metric values which correspond to each combination of the transmitted symbol candidates provided by transmitted symbol estimation part 40. The diversity combiner 70 combines the metric values from the metric generator $18_1$ and $18_2$, and outputs diversity-combined metric values to the transmitted symbol estimation part 40. The transmitted symbol estimation part 40 selects the most likely combination set of the transmitted symbol candidates by using the diversity-combined metric value provided by the diversity combiner 70, and outputs the most likely combination set of the transmitted symbol candidates to the terminal OUTd.

Figure 6:
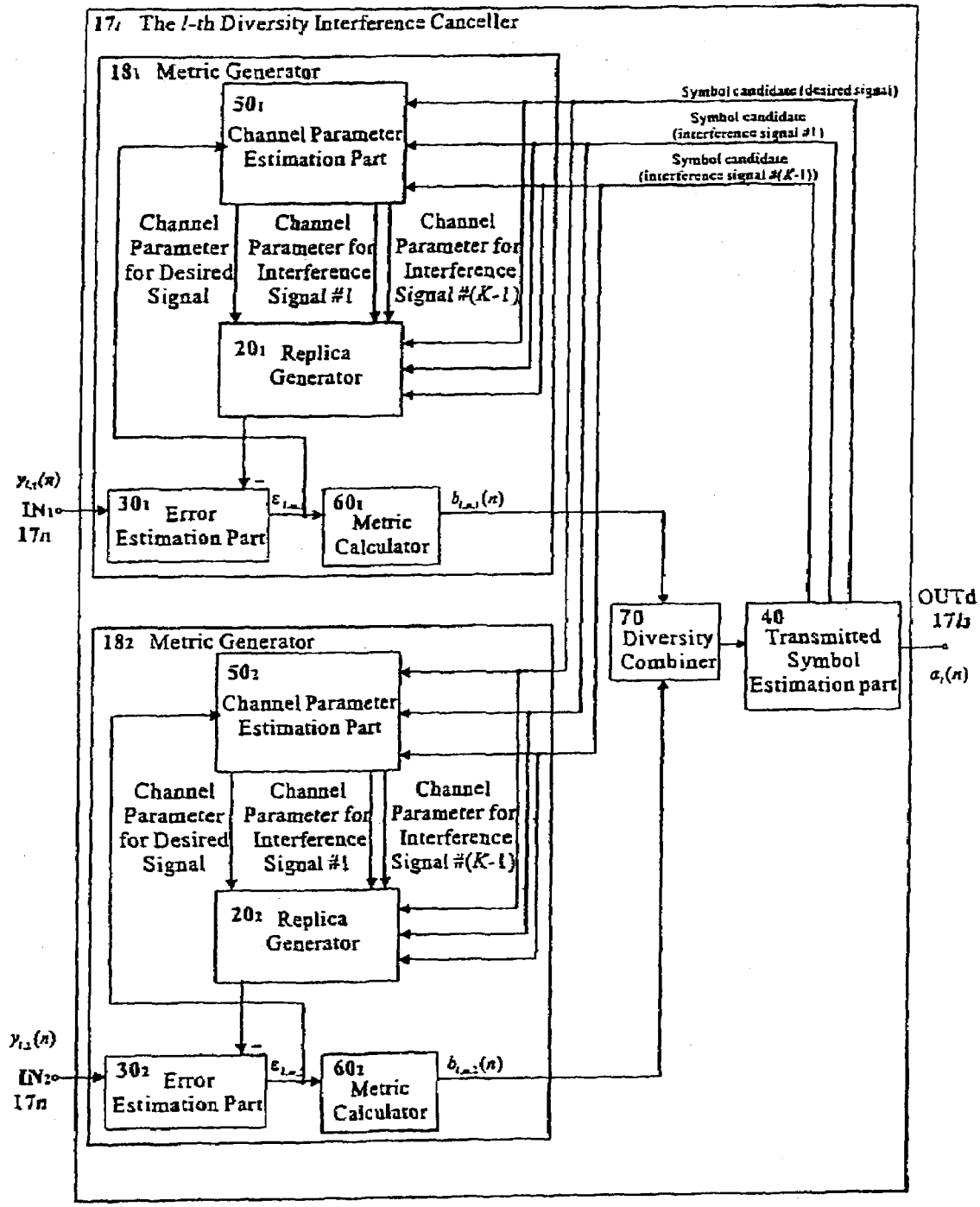
FIG. 6 is a block diagram of a two-branch diversity interference canceller illustrating a conceptual block of a replica generation type of the present invention.

FIG. 6 shows an embodiment of the metric generators $18_1$ and $18_2$ of the l-th interference canceller $17_1$ for two-branch diversity reception. The transmitted symbol estimation part 40 provides all possible combination set of the desired and the interference symbol candidates to the metric generators $18_1$ and $18_2$ one by one. At the diversity branch #1, the metric generator $18_1$ consists of a channel estimator $50_1$, a replica generator $20_1$, an error estimation part $30_1$ and a metric calculator $60_1$. In the channel estimator $50_1$, the channel parameter set, e.g., channel impulse responses both for the desired and interference signals are stored. The channel parameter set is fed to the replica generator $20_1$. The replica generator $20_1$ generates the replica signal of the received signal, which is the received signal corrupted by the distortion of the desired signal transmission channel, e.g., fading, and the interference signals, e.g., co-channel signal which also corrupted by the interference signal transmission channel distortion such as fading. The error estimation part $30_1$ calculates error signal $\epsilon_{l,m,1}$ by using the above mentioned replica signal and the l-th subcarrier received signal $y_{l,1}(n)$ at diversity branch #1 at the terminal IN1. The error signal $\epsilon_{l,m,1}$ is used for the update of the channel parameters in the channel parameter estimator $50_1$. The error signal $\epsilon_{l,m,1}$ is also fed to the metric calculator $60_1$. The metric calculator $60_1$ calculates a branch metric value $b_{l,m,1}(n)$. The branch metric value $b_{l,m,1}(n)$ is fed to the diversity combiner 70. At the diversity branch #2 in FIG. 6, the metric generator $18_2$ consists of a channel estimator $50_2$, a replica generator $20_2$, an error estimation part $30_2$ and a metric calculator $60_2$. In the channel estimator $50_2$, the channel parameter set, e.g., channel impulse responses both for the desired and interference signals at the diversity branch #2 are stored. The channel parameter set is fed to the replica generator $20_2$. The replica generator $20_2$ generates the replica signal of the received signal, which is the received signal corrupted by the distortion of the desired signal transmission channel, e.g., fading, and the interference signals, e.g., co-channel signal which also corrupted by the interference signal transmission channel distortion such as fading. The error estimation part $30_2$ calculates error signal $\epsilon_{l,m,2}$ by using the above mentioned replica signal and the l-th subcarrier received signal $y_{l,2}(n)$ at diversity branch #2 at the terminal IN2. The error signal $\epsilon_{l,m,2}$ is used for the update of the channel parameters in the channel parameter estimator $50_2$. The error signal $\epsilon_{l,m,2}$ is also fed to the metric calculator $60_2$. The metric calculator $60_2$ calculates the branch metric value $b_{l,m,2}(n)$. The branch metric value $b_{l,m,2}(n)$ is fed to the diversity combiner 70. One embodiment example of the metric calculators $60_1$ and $60_2$ is absolute square circuits that calculate the absolute square value of the error signals by $$b_{l,m,j}(n) = |\epsilon_{l,m,j}|^2. \tag{1}$$

where l, m, j indicate the m-th set of the desired and interference signal candidates on l-th sub-channel at diversity branch j, and n indicate the time index at t=nT. The two branch metric values $b_{l,m,1}(n)$ and $b_{l,m,2}(n)$ are combined in the diversity combiner 70 to be a combined branch metric in FIG. 6. One embodiment example of the diversity combiner 70 is an adder that sums the metric values from the metric generators $18_1$ and $18_2$ up together. For example, in case of two branch diversity reception scheme, the sum of the metric values $b_{l,m,1}(n)+b_{l,m,2}(n)$ is calculated as a combined metric. In case of J diversity branch reception, the diversity-combined metric value $b_{l,m}(n)$ for the m-th set of the candidates on l-th sub-channel is calculated as $$b_{l,m}(n) = \sum_{j=1}^{J} b_{l,m,j}. \tag{2}$$

The diversity-combined metric value $b_{l,m}(n)$ is fed to the transmitted symbol estimation part 40. The transmitted symbol estimation part 40 selects the most likely combination set of the desired and the interference symbol candidate judging from the corresponding combined branch metric value, and outputs the most likely desired bit sequence to be transmitted as the received bit sequence to the terminal OUTd. The transmitted symbol estimation part 40 can be configured so as to output interference bit sequences for multi-user detection. The channel parameter estimation part $50_1$ received the most likely set of the candidate to be transmitted and updates the channel parameters at the diversity branch #1 both for the desired and the interference signals by using the estimation error signal $e_{l,m,1}$ which corresponds to the most likely set of the candidate to be transmitted. The channel parameter estimation part $50_2$ also received the above mentioned most likely set of the candidate and updates the channel parameters at the diversity branch #2 both for the desired and the interference signals by using the estimation error signal $e_{l,m,2}$ which corresponds to the most likely set of the candidate to be transmitted. In updating channel parameters both in the channel parameter estimation parts $50_1$ and $50_2$, the channel parameter estimation part $50_1$ and $50_2$ may employ an adaptation algorithm such as Recursive Least Squares (RLS) or Least Mean Square (LMS) algorithms. In this channel parameter update, the set of signal symbol candidates both of the desired and the interference signals are also used as reference signals in the adaptation algorithm. The channel parameter estimation parts $50_1$ and $50_2$ provide the updated channel parameters to the replica generators $20_1$ and $20_2$, respectively, for the next iteration of both the transmitted symbol estimation and the channel parameter estimation. The diversity reception is effective in discriminating or canceling the interference signals because of the different characteristics of the propagation channels.

Figure 7:
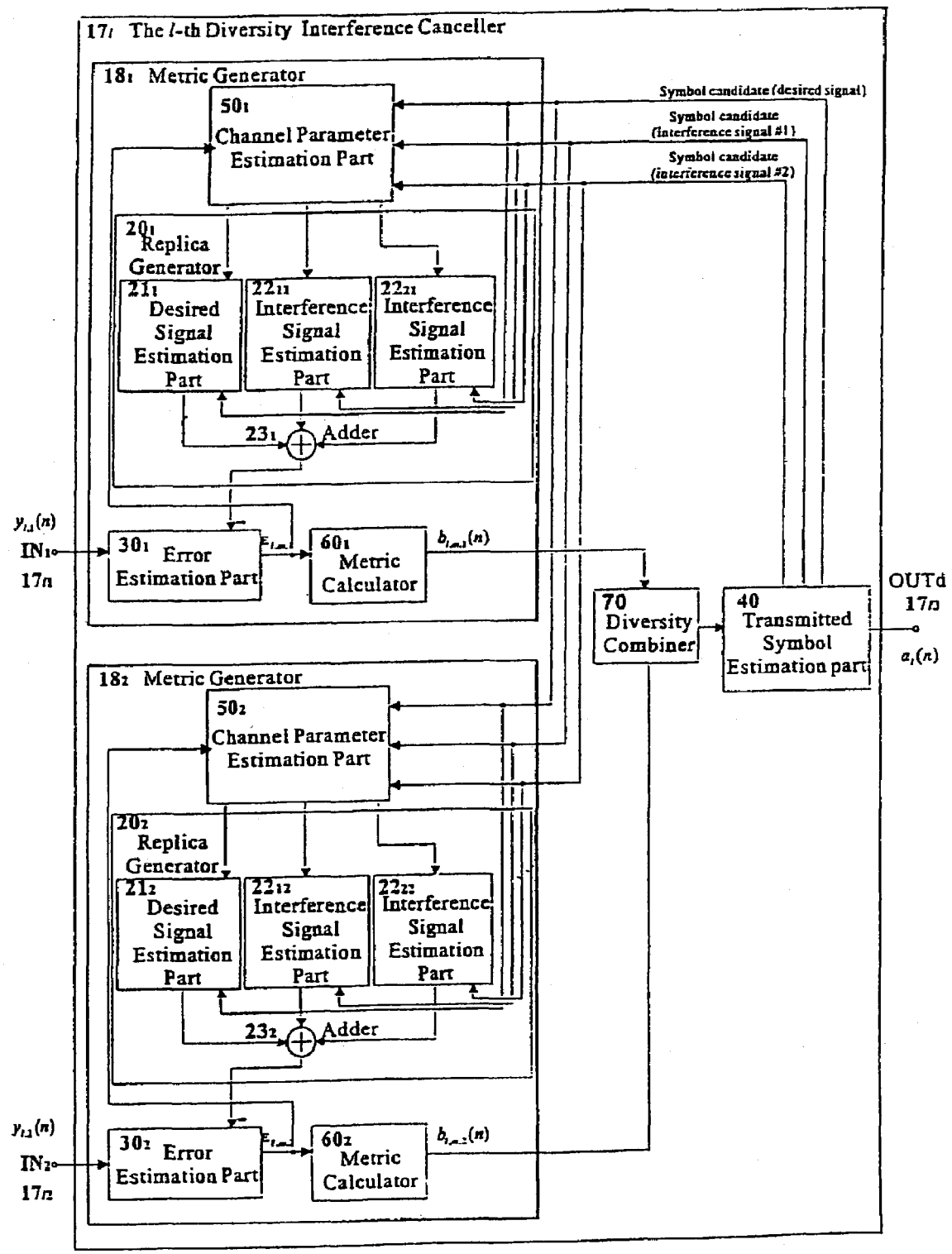
FIG. 7 is a block diagram of a two-branch diversity interference canceller illustrating a replica generation type of the present invention.

FIG. 7 shows an embodiment of the replica generators $20_1$ and $20_2$ of the l-th interference canceller $17l$ for two-branch diversity reception. In this embodiment, the replica generator $20_1$ consists of one desired signal estimation part $21_1$, and at least one interference signal estimation part, e.g., $22_{11}$. In FIG. 7, one desired signal and two-interference signal case are used in this example. But this scheme can be easily extended to the case where there are more than one desired and more than two interference signals. The channel parameter set is divided into the channel parameters of the desired and the interference signals. Each channel parameter is fed to the corresponding signal estimation part, e.g., $21_1$, $22_{11}$ or $22_{21}$, in the replica generator $20_1$. The desired signal estimation part $21_1$ generates the replica signal of the desired signal, which is corrupted by the desired signal transmission channel distortion such as fading, by using the desired signal estimated channel parameter and the desired signal symbol candidate. The interference signal estimation part $22_{11}$ generates the replica signal of the interference signal #1 by using the interference signal #1 estimated channel parameter at diversity branch #1 and the interference signal #1 symbol candidate. The above mentioned interference signal #1 replica is also corrupted by the interference signal #1 transmission channel distortion such as fading. The interference signal estimation part $22_{21}$ generates the replica signal of the interference signal #2 by using the interference signal #2 estimated channel parameter at diversity branch #1 and the interference signal #2 symbol candidate. The above mentioned interference signal #2 replica is also corrupted by the interference signal #2 transmission channel distortion such as fading. In case of the multiple interference signals more than 2, the interference signal estimation part can be added to the replica generator $20_1$, and the channel estimator $50_1$ and the transmitted symbol estimation part 40 can be easily extended. The replica signals, say, from $21_1$, $22_{11}$ and $22_{21}$, are summed up together in the replica combining adder $23_1$ to be the replica signal of the received signal. The above mentioned replica signal contains the desired signal, the interference signal #1 and #2, all of which are corrupted by the corresponding transmission channel fading effects at diversity branch #1. At diversity branch #2 in FIG. 7, the replica generator $20_2$ consists of one desired signal estimation part $21_2$, at least one interference signal estimation part, say, $22_{12}$. The channel parameter set, which is provided by the channel parameter estimation part $50_2$, is divided into the channel parameters of the desired and the interference signals. Each channel parameter is fed to the corresponding signal estimation part, say, $21_2$, $22_{12}$ or $22_{22}$, in the replica generator $20_2$. The desired signal estimation part $21_2$ generates the replica signal of the desired signal, corrupted by the desired signal transmission channel distortion such as fading, by using the desired signal estimated channel parameter at diversity branch #2 and the desired signal symbol candidate. The interference signal estimation part $22_{12}$ generates the replica signal of the interference signal #1 by using the interference signal #1 estimated channel parameter at diversity branch #2 and the interference signal #1 symbol candidate. The above mentioned interference signal #1 replica is also corrupted by the interference signal #1 transmission channel distortion such as fading. The interference signal estimation part $22_{22}$ generates the replica signal of the interference signal #2 by using the interference signal #2 estimated channel parameter at diversity branch #2 and the interference signal #2 symbol candidate. The above mentioned interference signal #2 replica is also corrupted by the interference signal #2 transmission channel distortion such as fading. In case of more than 2 multiple interference signals, the interference signal estimation part can be added to the replica generator $20_2$ and the channel estimator $50_2$. The replica signals, e.g., from $21_2$, $22_{12}$ and $22_{22}$, are summed up together in the replica combining adder $23_2$ to be the replica signal of the received signal. The above mentioned replica signal contains the desired signal, the interference signal #1 and #2, all of which are corrupted by the corresponding fading transmission channel effects at diversity branch #2.

Figure 8:
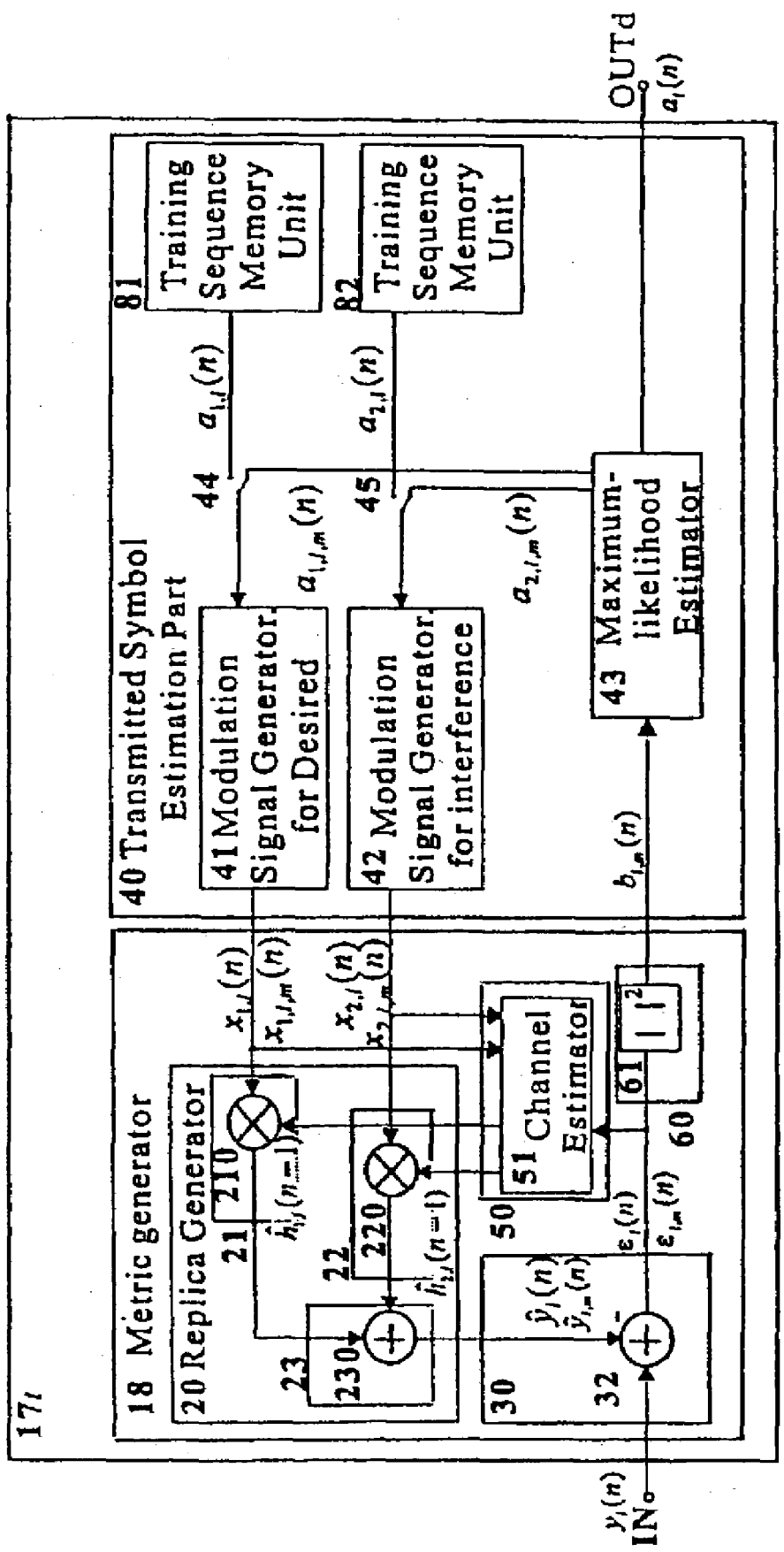
FIG. 8 is a detailed block diagram of the interference canceller of FIG. 4.

FIG. 8 illustrates a detailed block diagram of the interference canceller $17_1$ of FIG. 4. In FIG. 8, the desired signal and one interference signal are considered for example. A desired signal estimation part 21 and an interference signal estimation part 22 are realized by single taps (multipliers only) 210 and 220, respectively. A transmitted symbol estimation part 40 can be realized by a modulation signal generator 41 for desired signals, the modulation signal generator 42 for the interference signal, a maximum likelihood estimator 43, training sequence memory units 81 and 82, and training/tracking mode switches 44 and 45. In the maximum likelihood estimator 43, only the present states both of the desired and interference signals are considered.

Figure 13:
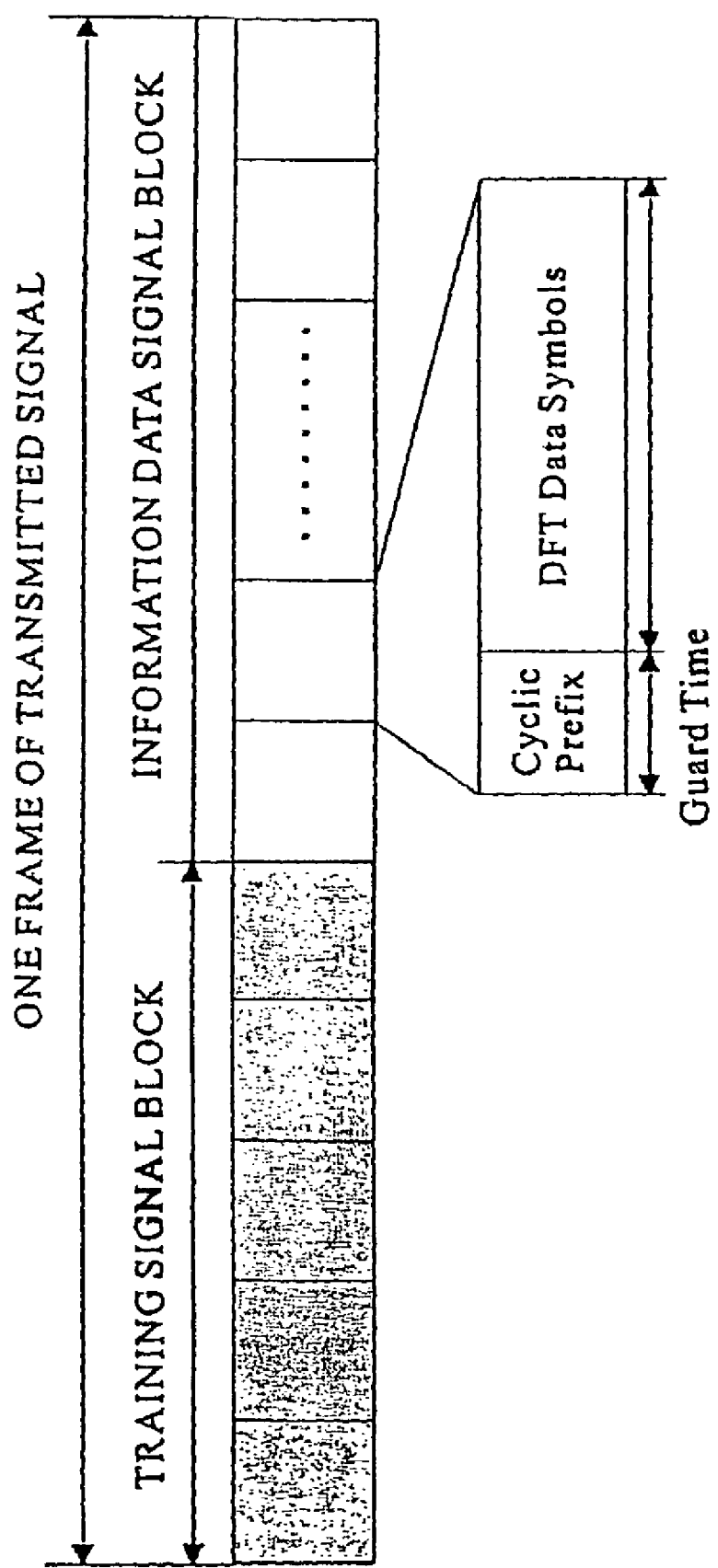
FIG. 13 is a diagram showing an example of the configuration of a received burst signal.

It is assumed, for example, that each radio station transmits an OFDM signal with a frame configuration as shown in FIG. 13, wherein training signal blocks are added to the beginning of an information data signal block (called preamble). The training signal blocks can also be placed at the intermediate portion (called mid-amble) or the end of an information data signal blocks (called post-amble). The training signal sequences are known sequence both at the transmitter and at the receiver, and are used for initial channel estimation both of the desired and the interference signals, respectively. It is preferable that the training patterns are unique patterns, which have high auto-correlation of symbol sequence of their own but have low cross-correlation value between each other. With the use of training patterns whose symbol sequence patterns are orthogonal to each other, it is possible to generate the replica signals of the desired and interference signals separately to such an extent that the replica signals have high accuracy. When a plurality of interference signals are present, their replica signals can be separately generated with high accuracy by adopting the training symbol sequences orthogonal to each other.

In the training mode, pre-known training bit sequences $a_{1,l}(n)$ and $a_{2,l}(n)$ for the desired and interference signals, respectively, which are stored as training patterns in the training sequence memory units 81 and 82, respectively, are fed by the switches 44 and 45 to the modulation signal generator units 41, 42, respectively. The modulation signal generator 41 transforms or maps the desired signal bit into the complex modulation symbol $x_{1,l}(n)$. The modulation signal generator 42 transforms or maps the interference signal bit into complex modulation symbol $x_{2,l}(n)$. The output of the modulation signal generators 41 and 42 are fed to the replica generator 20 and a channel parameter estimation part 50. The replica generator 20 is, for example, made up of a single complex tap 210 which represents the desired signal transmission channel parameter $\hat{h}_{1,l}(n-1)$, a single complex tap 220 which represents the interference signal transmission channel parameter $\hat{h}_{2,l}(n-1)$ and a complex adder 230 which combines the desired and the interference signal. The output value of the desired signal estimation part 21 becomes $x^*_{1,l}(n)\hat{h}_{1,l}(n-1)$, which represents the desired complex baseband signal corrupted by the distortion of the desired signal channel such as fading. The output value of the interference signal estimation part 22 becomes $x^*_{2,l}(n)\hat{h}_{2,l}(n-1)$, which represents the interference complex baseband signal corrupted by the distortion of the interference signal channel such as fading. The complex adder 230 sums these values up together to output the replica of the received signal $x^*_{1,l}(n)\hat{h}_{1,l}(n-1)+x^*_{2,l}(n)\hat{h}_{2,l}(n-1)$. An error estimation part 30 is realized with a subtractor 32 in this embodiment. The subtractor 32 calculates the estimation error signal $\epsilon_l(n)$ on the l-th sub-carrier channel by $$\varepsilon_l(n) = y_l(n) - \left[x^*_{1,l}(n)\hat{h}_{1,l}(n-1) + x^*_{2,l}(n)\hat{h}_{2,l}(n-1)\right] \quad (3)$$

The estimation error signal $\epsilon_l(n)$ is fed to the channel parameter estimation part 50. In this embodiment, the channel parameter estimation part 50 is realized with a channel estimator 51. The channel estimator 51 updates both the desired and the interference signal transmission channel parameters $\hat{h}_{1,l}(n-1)$ and $\hat{h}_{2,l}(n-1)$ by using an adaptation algorithm, e.g., Least-Mean-Squares (LMS) algorithm or Recursive Least Square (RLS) algorithm with the estimation error $\epsilon_l(n)$. In case of the update by LMS algorithm, an example of the channel parameter update is performed as $$[\hat{h}_{1,l}(n)\hat{h}_{2,l}(n)]^H = [\hat{h}_{1,l}(n-1)\hat{h}_{2,l}(n-1)]^H + \mu[x_{1,l}(n)x_{2,l}(n)]^H \epsilon_l(n) \quad (4)$$

The channel estimator 51 then outputs the updated channel parameters $\hat{h}_{1,l}(n)$ and $\hat{h}_{2,l}(n)$ as tap coefficients to the complex taps 210 and 220 for the next replica generation. After the update of the tap coefficients, the training sequence memory units 81 and 82 output the next training bit sequences $a_{1,l}(n+1)$ and $a_{2,l}(n+1)$ to the modulation signal generators 41 and 42 through the switches 44 and 45. The above mentioned replica generation process in the replica generator 20, the error estimation process in the error estimation part 30 and the channel parameter update process in the channel estimator 50 are iteratively performed until the end of the training sequence. As the results, at the end of the training sequence, the channel parameters converge in the channel parameters which represent the real transmission channel properties. The training mode is a process to get the channel parameters of the desired and the interference signal transmission channels with the training sequences.

After the training mode, the tracking mode begins to work. In the tracking mode, the information data signal blocks in FIG. 13 are processed. During the tracking mode, the switches 44 and 45 connect the maximum likelihood estimator 43 to the modulation signal generators 41 and 42. The maximum likelihood estimator 43 outputs sequentially all the combination set of the desired and the interference signal bit patterns $a_{1,l,m}(n)$ and $a_{2,l,m}(n)$ to the modulation signal generators 41 and 42, where m is an index to the possible set of the desired and the interference signal bit patterns. For all values of m, that is, all possible combination sets of the desired and the interference signal bit patters, the following process is performed:

(1) The modulation signal generator 41 transforms or maps the desired signal bit patterns $a_{1,l,m}(n)$ into complex modulation symbol $x_{1,l,m}(n)$. The modulation signal generator 42 transforms or maps the interference signal bit patterns $a_{2,l,m}(n)$ into complex modulation symbol $x_{2,l,m}(n)$.

(2) The output of the modulation signal generators 41 and 42 are fed to the replica generator 20 and the channel parameter estimation part 50.

(3) The replica generator 20 generates the replica signal. The single complex tap 210 stores the desired signal transmission channel parameter $\hat{h}_{1,l}(n-1)$ which was obtained at the former iteration. The single complex tap 220 stores the interference signal transmission channel parameter $\hat{h}_{2,l}(n-1)$ which was obtained at the former iteration. In case of the very beginning of the tracking mode, the channel parameters obtained during the training mode are used. The complex tap 210 calculates the value $x^*_{1,l,m}(n)\hat{h}_{1,l}(n-1)$ which represents the desired complex baseband signal corrupted by the distortion of the desired signal channel such as fading. The complex tap 220 calculates the value $x^*_{2,l,m}(n)\hat{h}_{2,l}(n-1)$ which represents the interference complex baseband signal corrupted by the distortion of the interference signal channel such as fading. The complex adder 230 sums these values up together to output the replica $\hat{y}_{l,m}(n)$ of the received signal as $$\hat{y}_{l,m}(n) = x_{1,l,m}(n)\hat{h}_{1,l}(n-1) + x^*_{2,1,m}(n)\hat{h}_{2,1}(n-1). \quad (5)$$

(4) The error estimation part 30 calculates the estimation error signal. The subtractor 32 calculates the estimation error signal $\epsilon_{l,m}(n)$ on the l-th sub-carrier channel by $$\epsilon_{l,m}(n) = y_l(n) - \hat{y}_{l,m}(n) \quad (6)$$

(5) The error signal $\epsilon_{l,m}(n)$ is fed to the metric calculator 60. In the metric calculator 60, the absolute-square circuit 61 calculates branch metric $b_{l,m}(n)$ by $$b_{l,m}(n) = |\epsilon_{l,m}(n)|^2. \quad (7)$$

where l and m indicate the m-th set of the desired and interference signal candidates on l-th sub-channel.

The maximum likelihood estimator 43 selects the most likely set $a_{1,l}(n)$ and/or $a_{2,l}(n)$ of the desired and interference signal candidates and outputs to the terminal OUTd. In case of the branch metric defined in equation (7), the maximum likelihood estimator 43 selects the most likely set $a_{1,l,m}(n)$ and/or $a_{2,l,m}(n)$ so as to minimize the $b_{l,m}(n)$ with regard to the index m. The estimation error signal $\epsilon_{l,m}(n)$ is fed to the channel parameter estimation part 50, where m' gives the minimum $b_{l,m}(n)$ value in equation (7) for all possible m's. The channel estimator 51 updates both the desired and the interference signal transmission channel parameters $\hat{h}_{1,l}$ (n−1) and $\hat{h}_{2,l}$(n−1) by using an adaptation algorithm, e.g., Least-Mean-Squares (LMS) algorithm or Recursive Least Square (RLS) algorithm with the estimation error $\epsilon_{l,m}$(n) and the selected set of $a_{1,l,m}$(n) and/or $a_{2,l,m}$(n). In case of updating by LMS algorithm, an example of the channel parameter update is performed as $$[\hat{h}_{1,l}(n)\hat{h}_{2,l}(n)]^H = [\hat{h}_{1,l}(n-1)\hat{h}_{2,l}(n-1)]^H + \mu [x_{1,l,m}(n)x_{2,l,m}(n)]^H \epsilon_{l,m}(n) \quad (8)$$

where m is a step size parameter.

The channel estimator 51 then outputs the updated channel parameters $\hat{h}_{1,l}$(n) and $\hat{h}_{2,l}$(n) as tap coefficients to the complex taps 210 and 220 for the next replica generation. After the update of the tap coefficients, the maximum likelihood estimator 43 outputs sequentially all the combination set of the desired and the interference signal bit patterns $a_{1,l,m}$(n+1) and $a_{2,l,m}$(n+1) to the modulation signal generators 41 and 42, where m is an index to the possible set of the desired and the interference signal bit patterns. For all values of m, the above mentioned processes from (1) to (5) are performed again. When the transmission channels do not vary fast in time, the channel parameter update process during the tracking mode can be stopped.

For generalization, it is assumed that a desired signal station user and (K−1) interference signal station users exist on the same OFDM channel. Let the channel transfer function on l-th sub-carrier of k-th user be $h_{k,l}$, the received signal on the l-th sub-carrier channel can be expressed as follows;

$$y_l(n) = \sum_{k=1}^{K} h_{k,l}(n) x_{k,l}(n) + n_l(n) \quad (9)$$

where $y_l$(n) is the received signal on the l-th sub-carrier, $x_{k,l}$(n) is the transmitted symbol on l-th sub-carrier of k-th user, and $n_l$(n) is filtered thermal noise on the l-th sub-carrier. The index n indicate the n-th time instant. FIG. 8 corresponds to the concrete embodiment in case of K=2.

During the training mode, the training process is performed. In this process, the switches 44 and 45 are connected to the individual training sequence memory units (81 and 82) which store the known training sequence, in order to make the tap coefficients $\hat{h}_{k,l}$(n) converge into the values which represent the channel transfer function of the corresponding desired and interference signal transmission channels. The modulation signal generators 41 and 42 generate corresponding training complex modulation symbols $x_{k,l}$(n). These symbols are fed to the multipliers 21 and 22. The output of the multipliers 210 and 220 become the replica signals of the desired and interference signals, respectively. These replica signals are summed up together at the adder 230 to become the replica signal $\hat{y}_l$(n) of the received signal which are the mixture of the desired and the interference signals as $$\hat{y}_l(n) = \sum_{k=1}^{K} x^*_{k,l}(n) \hat{h}_{k,l}(n-1) \quad (10)$$

where * denotes complex conjugation. $\hat{h}_{k,l}$(n−1) and $x_{x,l}$(n) denote, respectively, the k-th user's estimated complex channel response at time instant (n−1)T and the modulation training symbol of the k-th user on l-th sub-channel at time instant nT. T is the OFDM block duration. This replica signal $\hat{y}_l$(n) is subtracted at the subtractor 32 from the actual received signal $y_l$(n) and the error signal $\epsilon_l$(n) on l-th sub-carrier channel is obtained as follows;

$$\epsilon_l(n) = y_l(n) - \hat{y}_l(n) \quad (11)$$

The estimated channel response vector (tap coefficient vector) $H_l$(n) both for the desired and (K−1) interference signals is given by $$H_l^H(n) = [\hat{h}^*_{1,l}n \; \hat{h}^*_{2,l}n \; \ldots \; \hat{h}^*_{K,l}n] \quad (12)$$

where $^H$ denotes complex conjugation and transposition. Similarly, the modulation training symbol vector $X_l$(n) for the desired and (K−1) interference signals is given by $$X_l^H(n) = [x^*_{1,l}n, \; x^*_{2,l}n, \; \ldots \; x^*_{K,l}n] \quad (13)$$

The channel estimator 51 updates the estimated channel response vector $H_l$(n) by an adaptation algorithm such as RLS, LMS or a similar adaptation algorithm. Here, for example, the update of the estimated channel response vector $H_l$(n) using the LMS algorithm is explained. The channel estimator 51 updates the channel response vector $H_l$(n) using both the known modulation training symbol vector $X_l$(n) and the error signal $\epsilon_l$(n) as follows;

$$H_l^H(n) = H_l^H(n-1) + \mu X_l^H(n) \epsilon_l(n) \quad (14)$$

where m is a step size parameter.

After the above mentioned training process, the information data signal block is processed. At the beginning of the information data signal period, the estimated channel response $H_l$(n−1) obtained in the training process is used as a initial value of the estimated channel response vector $H_l$(n−1).

The maximum likelihood estimator 43 outputs the possible combinations of the desired signal and the interference signal bit candidates to the modulation signal generators 41 and 42. This combination set of the desired signal and the interference signal complex modulation symbols can be expressed as the modulation vector candidate $X_{l,m}$(n) for the desired and (K−1) interference signals on the l-th sub-carrier channel with a candidate index number of m as follows;

$$X_{l,m}^H(n) = [x^*_{1,l,m_1}(n), \; x^*_{2,l,m_2}(n), \; \ldots \; x^*_{K,l,m_K}(n)] \quad (15)$$

where m is a combined symbol index number (possible candidate number) defined as follows;

$$m = \sum_{k=1}^{K} M^{k-1} m_k \quad (16)$$

where M is a number of messages, for example M=4 in case of QPSK signaling, and $m_k$ is the k-th user signal message symbol index number which is an integer of $0 \leq m_k \leq (M-1)$, thus m takes an integer value ranging $0 \leq m \leq (M^k - 1)$.

For example, in case of BPSK signaling modulation, the complex message symbol $x_{k,l,m_k}(n)$ at the time instant nT is as follows;

$$x_{k,l,m_K}(n) = 1 \quad (m_k = 0) \quad (17)$$
$$= -1 \quad (m_k = 1)$$

Hence with two users, i.e. the desired signal station and one interference signal station, the modulation vector candidate $X_{l,m}(n)$ ($0 \leq m \leq 3$) at time instant nT takes one of the following vectors;

$$X_{l,0}^H(n) = [+1 \quad +1] \quad (18)$$
$$X_{l,1}^H(n) = [+1 \quad -1]$$
$$X_{l,2}^H(n) = [-1 \quad +1]$$
$$X_{l,3}^H(n) = [-1 \quad -1]$$

In the case of QPSK signaling modulation, for example, the complex message symbol $x_{k,l,m_k}(n)$ at the time instant nT is as follows;

$$x_{k,l,m_k}(n) = \frac{1}{\sqrt{2}} + j\frac{1}{\sqrt{2}} \quad (m_k = 0) \quad (19)$$
$$= -\frac{1}{\sqrt{2}} + j\frac{1}{\sqrt{2}} \quad (m_k = 1)$$
$$= -\frac{1}{\sqrt{2}} - j\frac{1}{\sqrt{2}} \quad (m_k = 2)$$
$$= \frac{1}{\sqrt{2}} - j\frac{1}{\sqrt{2}} \quad (m_k = 3)$$

Hence in case of QPSK signaling modulation with two users, the modulation vector candidates $X_{l,m}(n)$ ($0 \leq m \leq 15$) at time instant nT are the following vectors;

$$x_{l,0}^H(n) = \left[ \frac{1}{\sqrt{2}} + j\frac{1}{\sqrt{2}} \quad \frac{1}{\sqrt{2}} + j\frac{1}{\sqrt{2}} \right] \quad (20)$$

$$x_{l,1}^H(n) = \left[ \frac{1}{\sqrt{2}} + j\frac{1}{\sqrt{2}} \quad -\frac{1}{\sqrt{2}} + j\frac{1}{\sqrt{2}} \right]$$

$$x_{l,2}^H(n) = \left[ \frac{1}{\sqrt{2}} + j\frac{1}{\sqrt{2}} \quad -\frac{1}{\sqrt{2}} - j\frac{1}{\sqrt{2}} \right]$$

$$x_{l,3}^H(n) = \left[ \frac{1}{\sqrt{2}} + j\frac{1}{\sqrt{2}} \quad \frac{1}{\sqrt{2}} - j\frac{1}{\sqrt{2}} \right]$$

$$x_{l,4}^H(n) = \left[ -\frac{1}{\sqrt{2}} + j\frac{1}{\sqrt{2}} \quad \frac{1}{\sqrt{2}} + j\frac{1}{\sqrt{2}} \right]$$

$$x_{l,5}^H(n) = \left[ -\frac{1}{\sqrt{2}} + j\frac{1}{\sqrt{2}} \quad -\frac{1}{\sqrt{2}} + j\frac{1}{\sqrt{2}} \right]$$

$$x_{l,6}^H(n) = \left[ -\frac{1}{\sqrt{2}} + j\frac{1}{\sqrt{2}} \quad -\frac{1}{\sqrt{2}} - j\frac{1}{\sqrt{2}} \right]$$

-continued $$x_{l,7}^H(n) = \left[ -\frac{1}{\sqrt{2}} + j\frac{1}{\sqrt{2}} \quad \frac{1}{\sqrt{2}} - j\frac{1}{\sqrt{2}} \right]$$

$$x_{l,8}^H(n) = \left[ -\frac{1}{\sqrt{2}} - j\frac{1}{\sqrt{2}} \quad \frac{1}{\sqrt{2}} + j\frac{1}{\sqrt{2}} \right]$$

$$x_{l,9}^H(n) = \left[ -\frac{1}{\sqrt{2}} - j\frac{1}{\sqrt{2}} \quad -\frac{1}{\sqrt{2}} + j\frac{1}{\sqrt{2}} \right]$$

$$x_{l,10}^H(n) = \left[ -\frac{1}{\sqrt{2}} - j\frac{1}{\sqrt{2}} \quad -\frac{1}{\sqrt{2}} - j\frac{1}{\sqrt{2}} \right]$$

$$x_{l,11}^H(n) = \left[ -\frac{1}{\sqrt{2}} - j\frac{1}{\sqrt{2}} \quad \frac{1}{\sqrt{2}} - j\frac{1}{\sqrt{2}} \right]$$

$$x_{l,12}^H(n) = \left[ \frac{1}{\sqrt{2}} - j\frac{1}{\sqrt{2}} \quad \frac{1}{\sqrt{2}} + j\frac{1}{\sqrt{2}} \right]$$

$$x_{l,13}^H(n) = \left[ \frac{1}{\sqrt{2}} - j\frac{1}{\sqrt{2}} \quad -\frac{1}{\sqrt{2}} + j\frac{1}{\sqrt{2}} \right]$$

$$x_{l,14}^H(n) = \left[ \frac{1}{\sqrt{2}} - j\frac{1}{\sqrt{2}} \quad -\frac{1}{\sqrt{2}} - j\frac{1}{\sqrt{2}} \right]$$

$$x_{l,15}^H(n) = \left[ \frac{1}{\sqrt{2}} - j\frac{1}{\sqrt{2}} \quad \frac{1}{\sqrt{2}} - j\frac{1}{\sqrt{2}} \right]$$

The replica signal of the received signal at the output of the adder 230 becomes $X_{l,m}^H(n) \cdot H_l(n)$. The error signal $\varepsilon_{l,m}(n)$ for m-th candidate on the l-th sub-carrier channel becomes as follows;

$$\varepsilon_{l,m}(n) = y_l - X_{l,m}^H(n) \cdot H_l(n) \quad (21)$$

The absolute-squared error signal $|\varepsilon_{l,m}(n)|^2$ is calculated for each candidate index m in the metric calculation part 61 and is used as a metric $b_{l,m}(n)$ in the maximum likelihood estimator 43 to determine the most likely candidate so as to minimize the squared error signal value $b_{l,m}(n)$ as follows;

$$b_{l,m_{\min}}(n) = \underset{m}{\text{Min}}(|\varepsilon_{l,m}(n)|^2) \quad (22)$$

where $m_{min}$ is the index m which gives the minimum value of $b_{l,m}(n)$. The set of the desired and interference signals which has been transmitted most likely as complex symbols can be determined with $m_{min}$ according the index number defined in the equation (16).

When the transmission channel variation is relatively slow compared to the OFDM symbol rate, the channel response vector $H_l(n)$ can be used constantly even in the information data signal block. The channel response vector update process can be stopped after the training process. This case further can reduce the complexity of the embodiment in terms of the signal processing.

When the transmission channel varies very rapidly, such as the mobile radio channel for example, the channel response vector $H_l(n)$ can be updated OFDM-block-by-block by using an adaptation algorithm, such as RLS, LMS or other similar adaptation algorithms. Here, the update of the channel response vector $H_l(n)$ by the LMS algorithm is explained as an example. During the information data signal blocks, the channel estimator 51 updates the estimated channel response vector $H_l(n)$ using both the determined modulation symbol vector $X_{l,m_{min}}(n)$ and the error signal $\epsilon_{l,m_{min}}(n)$ obtained for the candidate having the index $m_{min}$ as follows;

$$H_l^H(n) = H_l^H(n-1) + \mu X_{l,m_{min}}^H(n)\varepsilon_{l,m_{min}}(n) \qquad (23)$$

where m is a step size parameter.

The updated channel response vector $H_l(n)$ is used for the replica generation at next step in Equation (21). The extension to the case where a plurality of the interferer is present, is straightforward by adding extra interference signal estimation parts same as 22, and modulated signal generating parts, same as 42.

Figure 9:
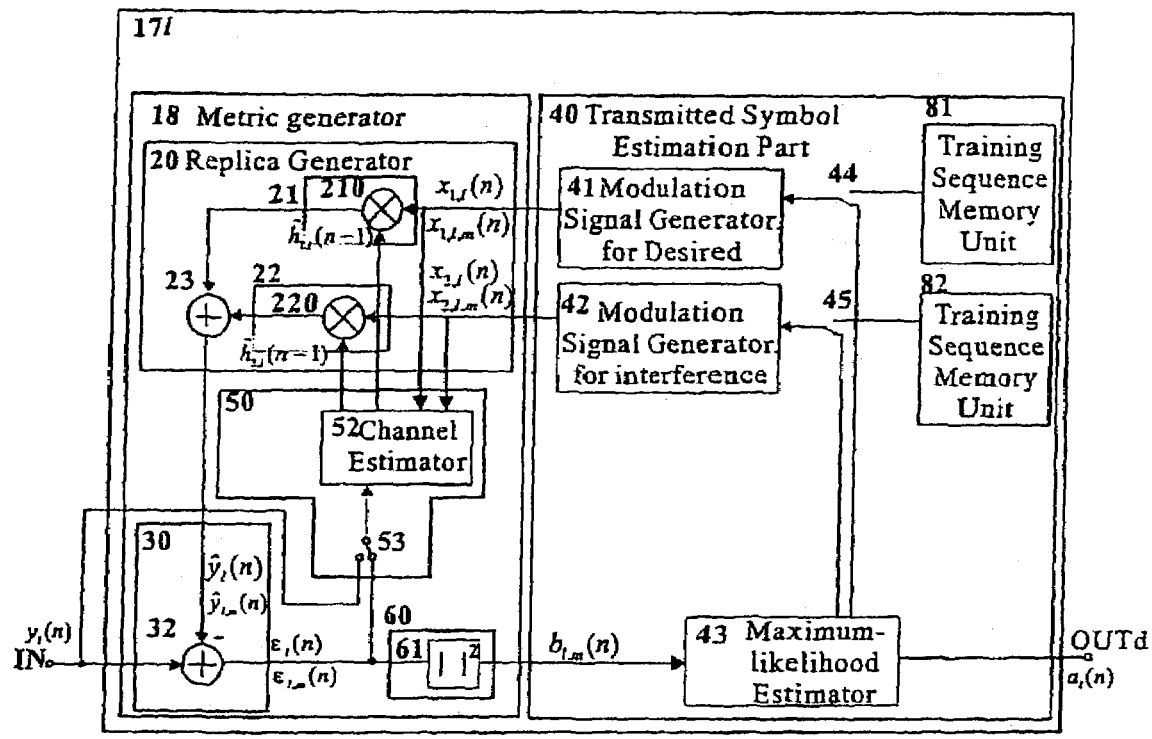
FIG. 9 is an alternative detailed block diagram of the interference canceller of FIG. 4.

FIG. 9 illustrates another embodiment of the interference canceller of FIG. 4. In FIG. 9, the channel parameter estimation part 50 is realized with another channel estimator 52. An example of the channel estimator 52 is a complex correlator which calculates complex cross-correlation between the received signal and the training sequence and determines the channel parameters. In this embodiment, during the training mode, the switch 44 and 45 connect the training sequence memory units 81 and 82 to the modulation signal generators 41 and 42, respectively in order to provide the complex modulation symbols $x_{1,t}(n)$ and $x_{2,t}(n)$ to the channel estimator 52. The received-signal/error-signal switch 53 connects the channel estimator 52 to a terminal IN in order for the channel estimator 52 to get the received signal $y_l(n)$. In the channel estimator 52, cross-correlation between the received signal $y_l(n)$ and the complex modulation symbols both of the desired and the interference signal are calculated over the training period, and then the tap coefficients both for the desired and the interference signal are determined. In the tracking mode, the received-signal/error-signal switch 53 connects the channel estimator 52 to the subtractor 32 so that the channel estimator 52 gets an estimation error signal. In the tracking mode, this embodiment works in the same manner as the embodiment described in FIG. 8. When the transmission channels do not vary fast in time, the channel parameter update process during the tracking mode can be stopped. The channel parameters can be used during the tracking mode in which the information data signal blocks are sent.

Figure 10:
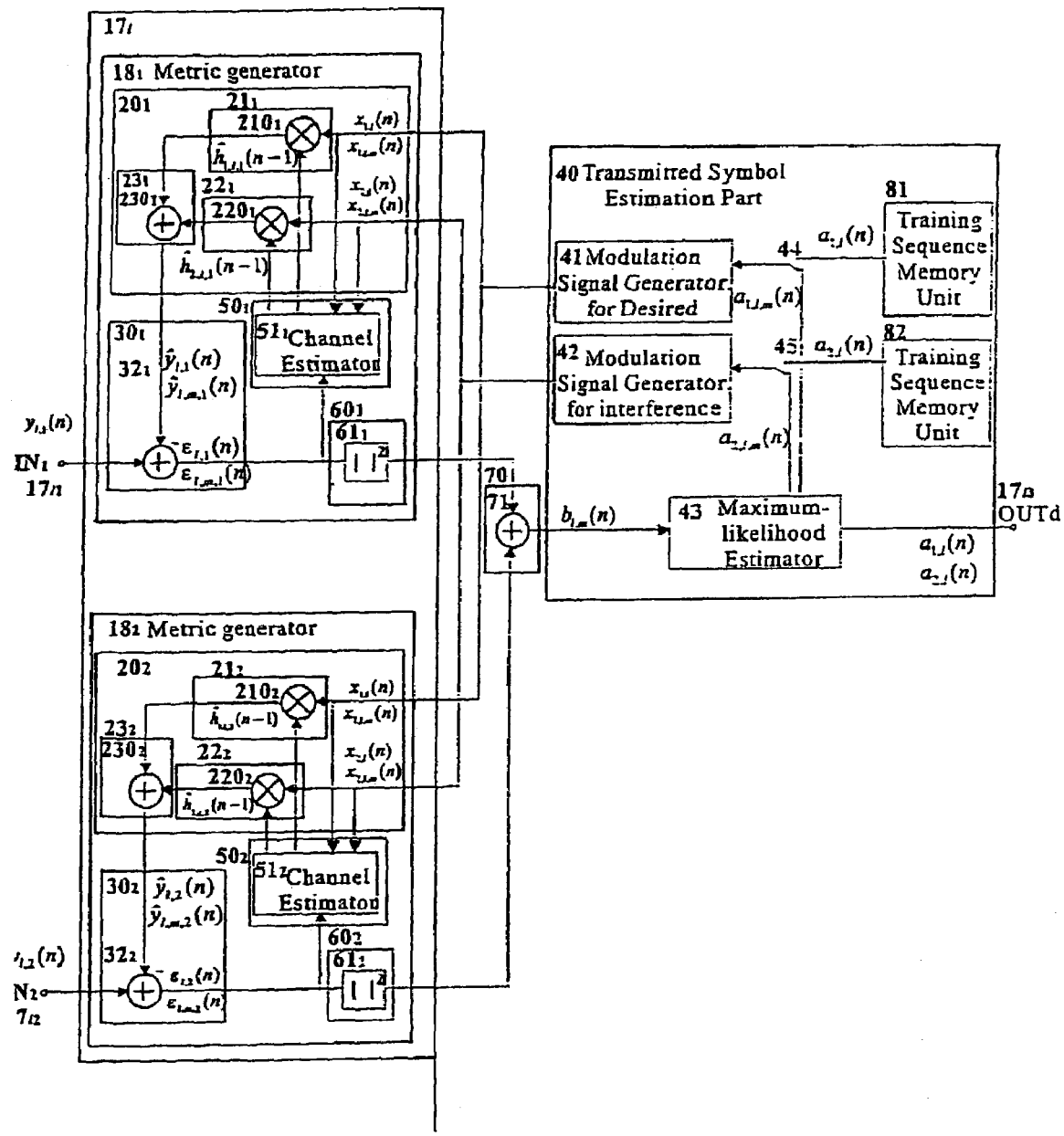
FIG. 10 is a detailed block diagram of the two-branch diversity interference canceller of FIG. 7.

FIG. 10 illustrates a concrete embodiment of the two-branch diversity interference canceller of FIG. 7. In FIG. 10, there are two metric generators 18$_1$ and 18$_2$, each of which consists of the channel parameter estimation parts 50$_1$ and 50$_2$, respectively, the desired signal estimation part 21$_1$ and 21$_2$, the interference signal estimation parts 22$_1$ and 22$_2$ and the error estimation part 30$_1$ and 30$_2$. In case of a J-branch diversity reception scheme, there are J metric generators; 17$_1$, 17$_2$, ..., 17$_J$. In FIG. 10 let the j-th input received signal at the j-th metric generator input terminal INj, the j-th error signal, the j-th channel response vector and the j-th modulation vector at the time instant nT be $y_{l,j}(n)$, $\epsilon_{l,j}(n)$, $H_{l,j}(n)$ and $X_l(n)$, the error signal $\epsilon_{l,m,j}(n)$ on the l-th sub-carrier channel during the training period is calculated by the following equation;

$$\varepsilon_{l,j}(n) = y_{l,j} - X_l^H(n) \cdot H_{l,j}(n-1) \qquad (24)$$

where $X_l^H(n)$ is provide by training sequence memory units 81 and 82 and is written by the same equation as the equation (13). The j-th channel response vector $H_{l,j}(n)$ is written by $$H_{l,j}^H(n) = [\hat{h}_{1,l,j}^* n \; \hat{h}_{2,l,j}^* n \; ... \; \hat{h}_{K,l,j}^* n], \qquad (25)$$

where $^H$ denotes complex conjugation and transposition and $\hat{h}_{k,l,j}(n)$ denotes the k-th user's channel response at the j-th diversity branch on l-th sub-channel. The j-th channel estimator 51j updates the j-th channel response vector $H_{l,j}(n)$ by adaptation algorithm such as LMS, RLS, or other similar adaptation algorithm. We explain here, for example, the update by LMS algorithm. The channel estimator 51j updates the channel response vector $H_{l,j}(n)$ using the known modulation training symbol vector $X_l(n)$ and the error signal $\epsilon_{l,j}(n)$ as follows;

$$H_{l,j}^H(n) = H_{l,j}^H(n-1) + \mu X_l^H(n)\varepsilon_{l,j}(n) \qquad (26)$$

where m is a step size parameter.

In tracking mode, let the m-th modulation vector candidate on the l-th subcarrier channel at the time instant nT be $X_{l,m}(n)$, the m-th estimation error signal $\epsilon_{l,m,j}(n)$ on the l-th subcarrier channel at the j-th diversity branch is calculated by the following equation;

$$\varepsilon_{l,m,j}(n) = y_{l,j} - X_{l,m}^H(n) \cdot H_{l,j}(n-1) \qquad (27)$$

The metric combiner 71 sums up together the m-th candidate squared error signals $|\epsilon_{l,m,j}(n)|^2$ to perform diversity combining by the following equation;

$$b_{l,m}(n) = \sum_{j=1}^{J} |\varepsilon_{l,m,j}(n)|^2 \qquad (28)$$

The maximum likelihood estimator 43 determines the most likely candidate so as to minimize the combined metric $b_{l,m}(n)$ which was calculated by equation (28), as follows;

$$b_{l,m_{min}}(n) = \operatorname*{Min}_{m} b_{l,m}(n) \qquad (29)$$

where $m_{min}$ is the index m which gives the minimum value of $b_{l,m}(n)$. The set of the desired and interference signals which most likely has been transmitted as complex symbols can be determined with $m_{min}$ according to the index number defined in the equation (16). When the transmission channels do not vary fast in time, the channel parameter update process during the tracking mode can be stopped. The channel parameters can be used during the tracking mode in which the information data signal blocks are sent. When the transmission channels vary fast in time, the channel parameters can be updated during tracking mode, the channel estimator 51$_j$ updates the channel response vector $H_{l,j}(n-1)$ using the determined modulation symbol vector $X_{l,m_{min}}(n)$ and the error signal $\epsilon_{l,m_{min},j}(n)$ as follows;

$$H_{l,j}^H(n) = H_{l,j}^H(n-1) + \mu X_{l,m_{\min}}^H(n)\varepsilon_{l,m_{\min},j}(n) \qquad (30)$$

where m is a step size parameter.

Figure 11:
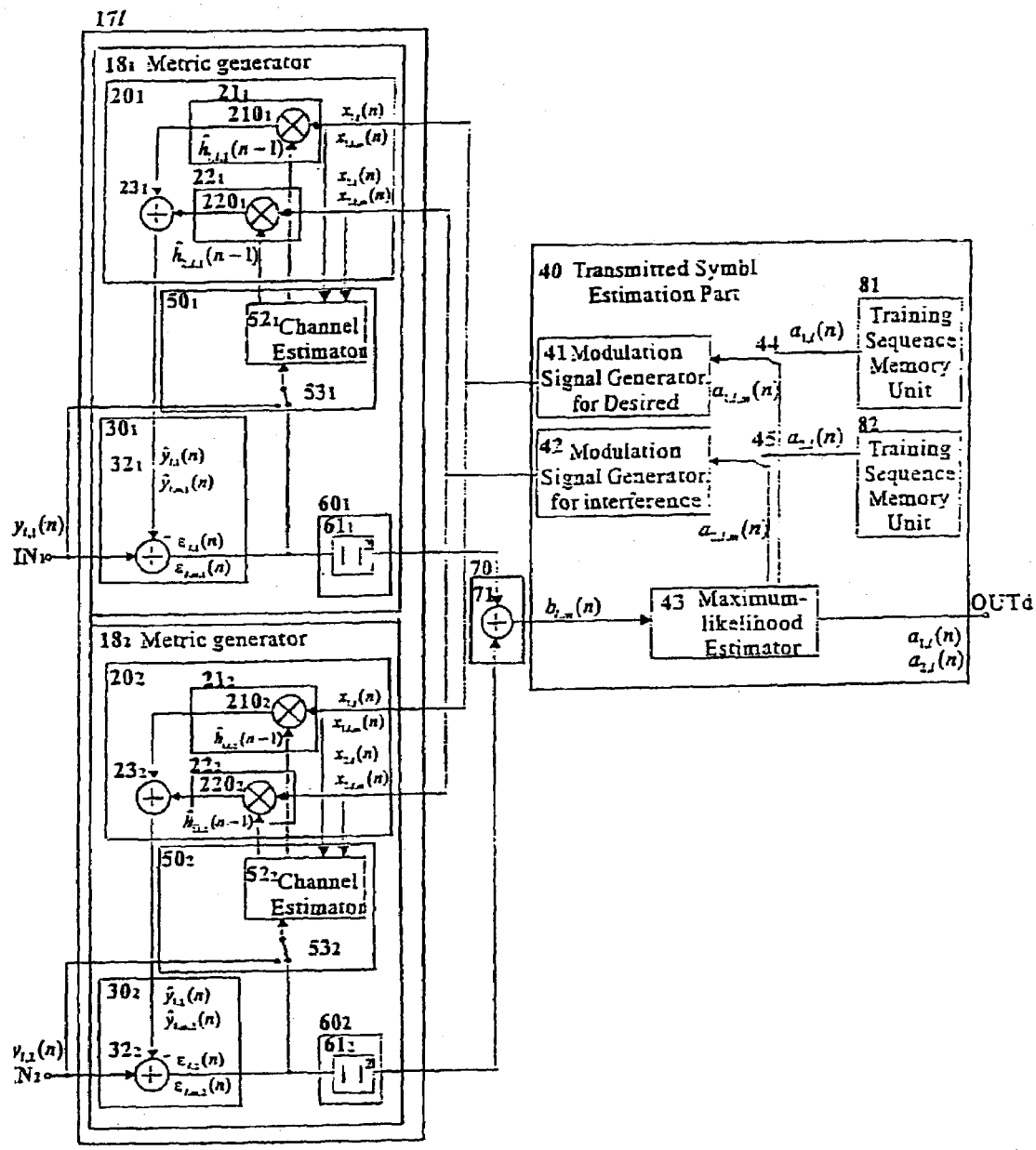
FIG. 11 is an alternative block diagram of the two-branch diversity interference canceller of FIG. 7.

FIG. 11 illustrates an alternative embodiment of the two-branch diversity interference canceller of FIG. 7. In FIG. 11, the channel parameter estimation parts $50_1$ and $50_2$ are realized with other channel estimators $52_1$ and $52_2$, respectively. An example of the channel estimators $52_1$ and $52_2$ are complex correlators which calculate complex cross-correlation between the received signal and the training sequence, and which determine the channel parameters. In this embodiment, during the training mode, the switches 44 and 45 connect the training sequence memory units 81 and 82 to the modulation signal generators 41 and 42, respectively in order to provide the complex modulation symbols $x_{1,l}(n)$ and $x_{2,l}(n)$ to the channel estimators $52_1$ and $52_2$. The received-signal/error signal switches $53_1$ and $53_2$ connect the channel estimators $52_1$ and $52_2$ to the terminal IN1 and IN2 so that the channel estimators $52_1$ and $52_2$ get the received signal $y_{l,1}(n)$ and $y_{l,2}(n)$, respectively. In the channel estimator $52_1$, cross-correlation between the received signal $y_{l,1}(n)$ and the complex modulation symbols, say, $x_{1,l}(n)$ and $x_{2,l}(n)$ of the desired and the interference signals, respectively, are calculated over the training period, and then the tap coefficients, say, $\hat{h}_{1,l,1}(n-1)$ and $\hat{h}_{2,l,1}(n-1)$ for the desired and the interference signal, respectively, are determined. In the channel estimator $52_2$, cross-correlation between the received signal $y_{l,2}(n)$ and the complex modulation symbols $x_{1,l}(n)$ and $x_{2,l}(n)$ of the desired and the interference signals, respectively, are calculated over the training period, and then the tap coefficients, say, $\hat{h}_{1,l,2}(n-1)$ and $\hat{h}_{2,l,2}(n-1)$ for the desired and the interference signal, respectively, are determined.

In the tracking mode, the received-signal/error-signal switches $53_1$ and $53_2$ connect the channel estimators $52_1$ and $52_2$ to the subtractors $32_1$ and $32_2$ so that the channel estimators $52_1$ and $52_2$ get estimation error signals. In the tracking mode, this embodiment works in the same manner as, say, the embodiment described in FIG. 10. When the transmission channels do not vary fast in time, the channel parameter update process during the tracking mode can be stopped. The channel parameters can be used during the tracking mode in which the information data signal blocks are sent.

Figure 12:
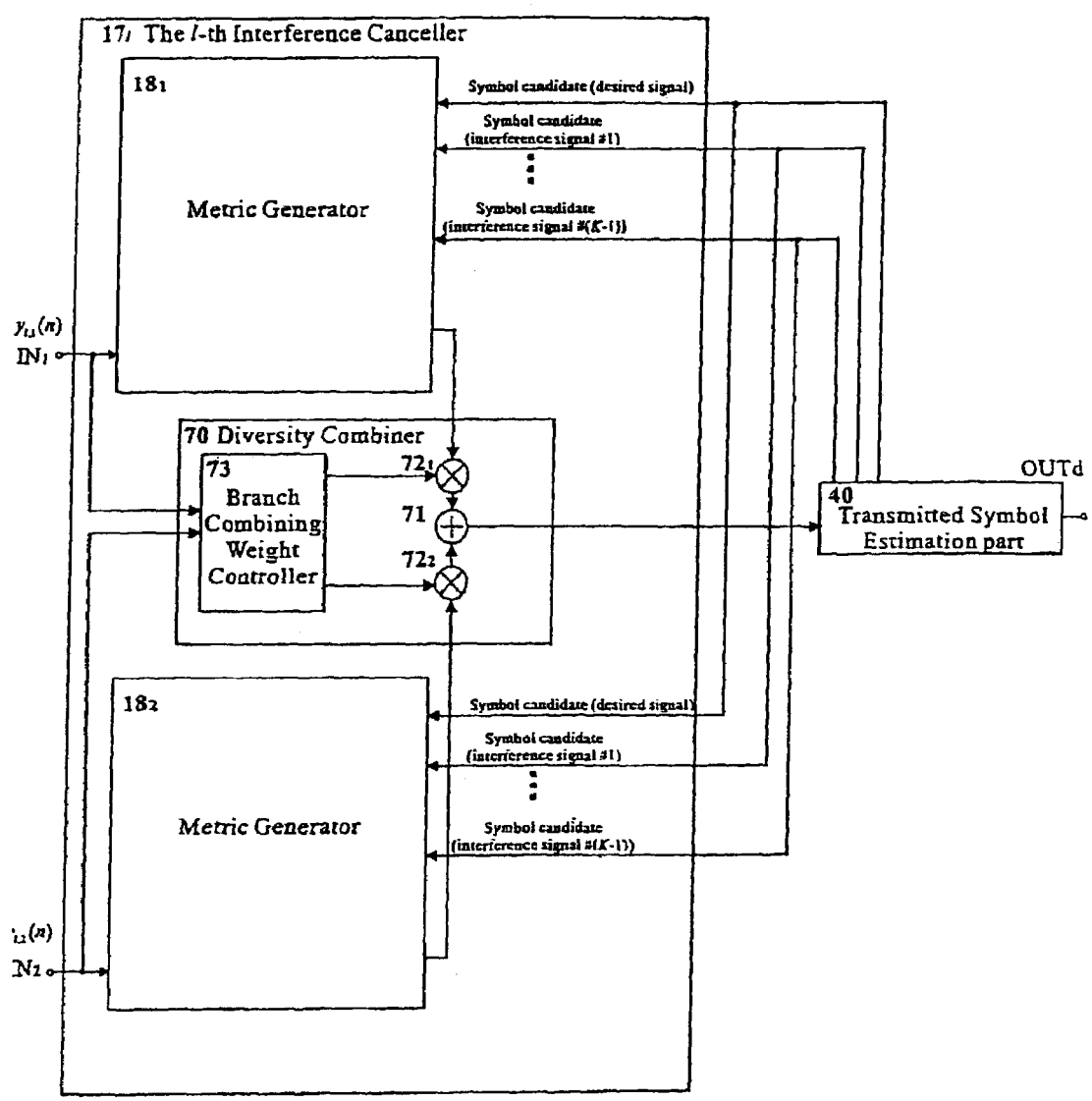
FIG. 12 is an alternative embodiment of the OFDM two-branch diversity receiver of FIG. 5C.

FIG. 12 illustrates an alternative embodiment of the OFDM two-branch diversity receiver of FIG. 5C. In FIG. 12, another embodiment of the diversity combiner 70 is depicted. The diversity combiner 70 is made up of a diversity combining adder 71, multipliers $72_1$ and $72_2$, a branch combining weight controller 73. The branch combining weight controller 73 receives channel information of received signals at diversity branches such as received signal strength information or other interference strength information, and determines weight-coefficients that weight each metric value of the diversity branch. The multipliers $72_1$ and $72_2$ receive weight-coefficients from the branch combining weight controller. Then, the multipliers $72_1$ and $72_2$ multiply each metric value from each metric generator by corresponding weight-coefficient, and output metric values to the adder 71. The adder 71 sums the weighted metric values up together and outputs a combined metric value to the transmitted symbol estimation part 40.

Figure 14:
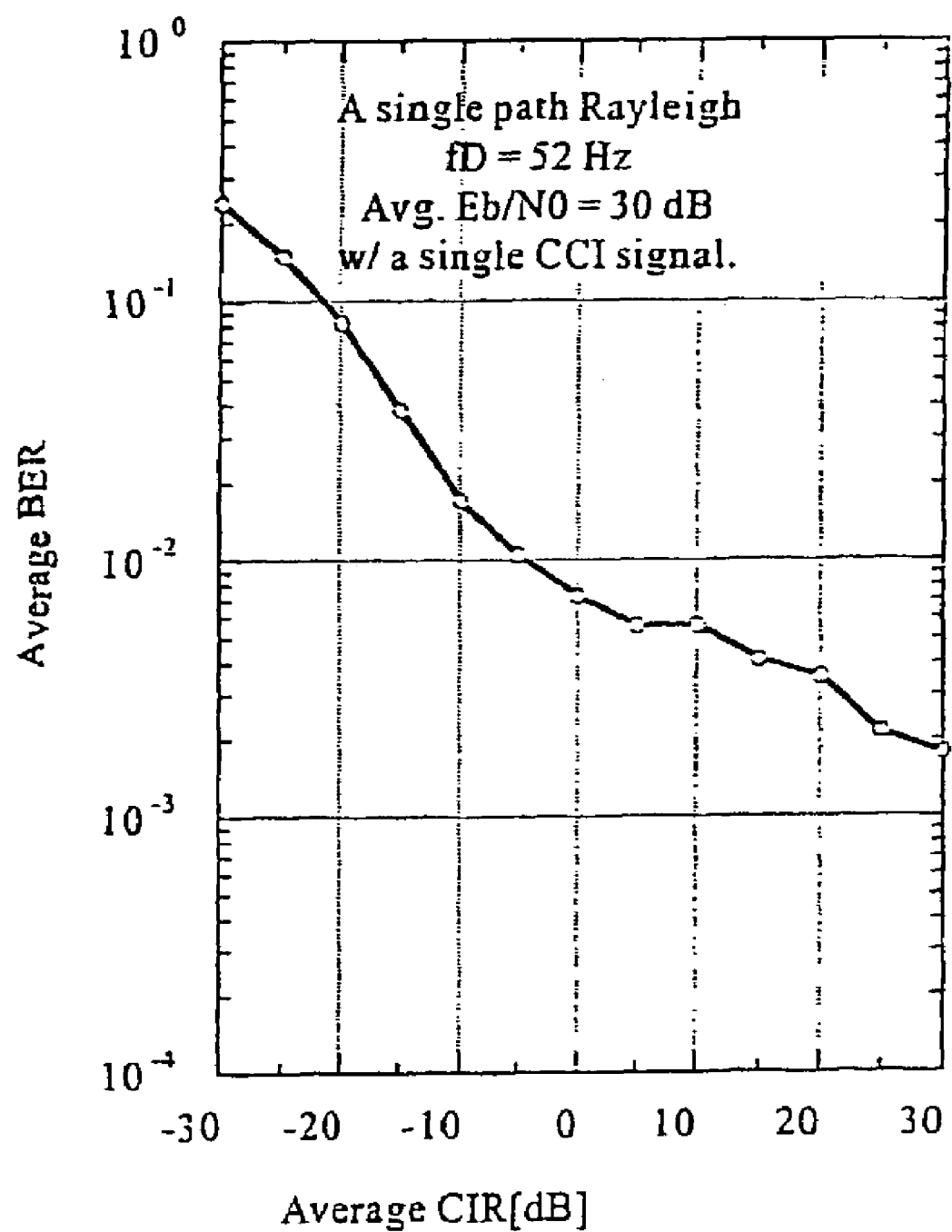
FIG. 14 is a Bit Error Rate (BER) diagram showing the effectiveness of the present invention.

FIG. 14 depicts the bit error rate (BER) performance of the present invention showing the effectiveness of the present invention. FIG. 14 shows that the average bit error rate of a receiver according to the present invention under the Rayleigh fading condition is less than $1.0\times10^{-2}$ for average Carrier-to-Interference Ratio (CIR)=−5 dB, where the Co-Channel Interference (CCI) signal is stronger than the desired signal by 5 dB. The effectiveness of the present invention can also be shown by the fact that the average BER value of the receiver according to the present invention at an average CIR of 0 dB is less than $1.0\times10^{-2}$ while that of a conventional signal detector in an OFDM receiver is 0.5.

What is claimed is:

1. A digital multi-carrier communication system, comprising:
at least one receiving branch, each receiving branch comprising a demodulating device configured for converting a received serial multi-carrier signal into a plurality of sub-carrier signals, the received serial multi-carrier signal comprising at least one desired signal and at least one interference signal, each demodulating device of the at least one receiving branch comprising:
a serial-to-parallel converter configured for converting the received serial multi-carrier signal into a plurality of parallel signal blocks;
a cyclic extension removal device configured for removing cyclic extensions inserted into a transmitted multi-carrier signal for removing inter-block interference; and
a Discrete Fourier Transform device configured for converting each signal block into a plurality of sub-carrier signals,
wherein the cyclic extension removal device is connected between the serial-to-parallel converter and the Discrete Fourier Transform device; and
a plurality of interference cancellers each associated with a respective one of the plurality of sub-carrier signals and configured for subtracting an estimated desired received sub-carrier signal and an estimated interference sub-carrier signal from a received sub-carrier signal so as to cancel co-channel interference.

2. The receiver as recited in claim 1 wherein the digital multi-carrier communication system is an OFDM-system.

3. The receiver as recited in claim 1 wherein the plurality of interference cancellers is connected between the Discrete Fourier Transform device and to a serial-to-parallel converter.

4. The receiver as recited in claim 1 wherein each of the plurality of interference cancellers comprises:
a transmitted symbol estimation part connected to a metric generator, the transmitted symbol estimation part being configured for applying a set of symbol candidates for the at least one desired signal and the at least one interference signal to the metric generator, and further configured for receiving metric values generated by the metric generator using a received sub-carrier signal and the set of symbol candidates so as to determine a most likely set of symbol candidates using the metric values.

5. The receiver as recited in claim 4 wherein each of the transmitted symbol estimation part is configured for outputting information data of the at least one desired signal and the at least one interference signal so as to form a multi-user detection receiver.

6. A receiver for a digital multi-carrier communication system, the receiver comprising:
  at least one receiving branch, each receiving branch comprising a demodulating device configured for converting a received serial multi-carrier signal into a plurality of sub-carrier signals;
  the received serial multi-carrier signal comprising at least one desired and at least one interference signal;
  a plurality of interference cancellers each associated with a respective one of the sub-carrier signals, each of the plurality of interference cancellers comprising:
    a metric generator; and
    a transmitted symbol estimation part connected to the metric generator, the transmitted symbol estimation part configured for applying a set of symbol candidates for the at least one desired signal and the at least one interference signal to the metric generator and further configured for receiving metric values generated by the metric generator using a received sub-carrier signal and the set of symbol candidates so as to determine a most likely set of symbol candidates using the metric values;
    the metric generator comprising:
      an error estimation part;
      a channel parameter estimation part configured for estimating signal transmission channel parameters of the at least one desired signal and the at least one interference signal using the set of the desired and the interference signal symbol candidates provided by the transmitted symbol estimation part and an estimation error signal provided by the error estimation part; and
      a replica generator configured for generating a replica signal from at least one desired signal and the at least one interference signal using the set of the desired and the interference signal symbol candidates and the desired and the interference signal channel parameters provided by the channel parameter estimation part, the error estimation part configured for generating the estimation error signal using the received sub-carrier signal and the replica signal; and
      a metric calculator connected to the transmitted symbol estimation part and configured for generating metric values from the estimation error signal.

7. The receiver as recited in claim 6 wherein the replica generator of each of the metric generator comprises:
  a desired signal estimation part configured for generating the replica of the desired signal using the channel parameter of the desired signal and a desired signal symbol candidate provided by the transmitted symbol estimation part;
  at least one interference signal estimation part each configured for generating a replica of a respective interference signal by using the interference signal transmission channel parameters and interference signal symbol candidates provided by the transmitted symbol estimation part; and
  a replica combining adder configured for combining the generated replicas of the desired and interference signals and further configured for outputting the combined replica to the error estimation part.

8. The receiver as recited in claim 6 wherein:
  the transmitted symbol estimation part comprises a first modulation signal generator configured for generating desired signal complex modulation symbols and at least one second modulation signal generator configured for generating interference signal complex modulation symbols, and
  wherein the replica generator of each metric generator comprises:
    a first complex multiplier configured for multiplying an output signal of the first modulation signal generator with the desired signal transmission channel parameter generated by the channel parameter estimation part;
    at least one second complex multiplier configured for multiplying an output signal of the respective second modulation signal generator with the respective interference signal transmission channel parameter generated by the channel parameter estimation part; and
    a replica combining adder connected to the first complex multiplier and the at least one second complex multiplier, the replica combined adder configured for summing the desired and interference signal replicas.

9. The receiver as recited in claim 8 wherein the transmitted symbol estimation part comprises:
  a first training sequence memory unit configured for storing a desired signal training bit sequence and further configured for generating a set of training bits;
  at least one second training sequence memory unit each configured for storing an interference signal training bit sequence and further configured for generating a set of training bits of a corresponding interference signal;
  a maximum likelihood estimator;
  a first switch configured for connecting the first training sequence memory unit during a training period and a respective output of the maximum likelihood estimator during a tracking period to the first modulation signal generator; and
  at least a second switch configured for connecting the respective second training sequence memory unit during a training period and a respective output of the maximum likelihood estimator during a tracking period to the respective second modulation signal generator.

10. The receiver as recited in claim 8 wherein each of the channel parameter estimation part comprises:
  a channel estimator having inputs connected to the first and second modulation signal generators and to the error estimation part and outputs connected to the first and second complex multiplier, the channel estimator being configured for estimating and/or updating said desired and interference transmission channel parameters using an adaptation algorithm.

11. The receiver as recited in claim 10 wherein the adaptation algorithm includes at least one of a recursive adaptation algorithm, a Recursive-Least-Squares algorithm and a Least-Mean-Square algorithm.

12. The receiver as recited in claim 9 wherein each of the channel parameter estimation part comprises:
  a switch and a channel estimator having inputs connected to the first and second modulation signal generators and to the switch and outputs connected to the first and second complex multiplier, the switch being configured for controllably supplying the received sub-carrier signal applied to the error estimation part or the error signal generated by the error estimation part to the channel estimator.

13. The receiver as recited in claim 6 wherein each of the metric calculator comprises an absolute-square circuit configured for calculating an absolute-squared value of an applied error signal.

14. The receiver as recited in claim 8 wherein each of the error estimation part comprises:
 a subtractor configured for subtracting a replica signal provided by the replica combining adder from the respectively received sub-carrier signal to generate the estimation error signal.

15. A receiver for use in a digital multi-carrier communication system, comprising:
 at least one receiving branch, each receiving branch comprising a demodulating device configured for converting a received serial multi-carrier signal into a plurality of sub-carrier signals, the received serial multi-carrier signal comprising at least one desired signal and at least one interference signal;
 a plurality of interference cancellers each associated with a respective one of the plurality of sub-carrier signals and configured for subtracting an estimated desired received sub-carrier signal and an estimated interference sub-carrier signal from a received sub-carrier signal so as to cancel co-channel interference;
 wherein the receiver is a multi-branch diversity receiver comprising a plurality of interference cancellers, each of the interference cancellers comprising:
  a plurality of metric generators, a number of the metric generators corresponding to a number of receiving branches, each metric generator being configured for generating metric values using a respective received sub-carrier signal of a different diversity branch and said set of symbol candidates;
  a transmitted symbol estimation part connected to the metric generators and configured for applying a set of symbol candidates for the at least one desired signal and the at least one interference signal to the metric generators; and
  a diversity combiner connected to the transmitted symbol estimation part and configured for combining the metric values received from the metric generators;
 wherein the transmitted symbol estimation part is configured for determining a most likely set of symbol candidates for at least one desired signal and at least one interference signal to be transmitted using metric values received from the diversity combiner.

16. The receiver as recited in claim 15 wherein the diversity combiner comprises a diversity combining adder.

17. The receiver as recited in claim 15 wherein the diversity combiner comprises:
 a branch combining weight controller configured for receiving a respective received sub-carrier signal on each receiving branch for computing combining weight-coefficients and outputting said weight-coefficients;
 a plurality of multipliers each connected to a respective one of the metric generators; and
 a diversity combining adder having inputs connected to the multipliers and an output connected to the transmitted symbol estimation part.

18. The receiver as recited in claim 15 wherein each of the transmitted symbol estimation part is configured for outputting information data of the at least one desired signal and the at least one interference signal so as to form a multi-user detection receiver.

19. A method for cancelling interference signals in a multi-carrier signal, the method comprising the steps of:
 receiving a serial baseband multi-carrier signal including at least one desired signal and at least one interference signal over at least one receiving branch of a receiver;
 converting the received multi-carrier signal into a plurality of baseband sub-carrier signals;
 cancelling co-channel interference in each sub-carrier signal by subtracting an estimated desired received sub-carrier signal and an estimated interference sub-carrier signal from a received sub-carrier signal;
 generating a plurality of sets of desired signal symbol sequence candidates and interference signal symbol sequence candidates;
 generating metric values from a respective received sub-carrier signal and the plurality of sets of desired and interference signal symbol candidates;
 providing transmission channel parameters of the at least one desired signal and the at least one interference signal;
 generating a replica signal of the respective received sub-carrier signal from the plurality of sets of desired and interference signal symbol candidates and the transmission channel parameters;
 calculating an estimation error signal from the received sub-carrier signal and the replica signal of the received sub-carrier signal;
 computing metric values from said estimation error signal;
 determining the most likely set of desired and interference symbol candidates as the set of desired and interference symbols to be transmitted by comparing a plurality of calculated metric values which correspond to each set of desired and interference signal symbol candidates;
 estimating and/or updating the transmission channel parameters of the at least one desired signal and the at least one interference signal using the determined set of desired and interference signal symbols and the estimation error signal and
 converting the sub-carrier signals to a multi-carrier output signal comprising the desired signal.

20. The method as recited in claim 19 further comprising the steps of:
 performing a maximum likelihood estimation using the metric values so as to determine a most likely set of desired and interference symbol candidates as a set of desired and interference signal symbols to be transmitted; and
 outputting bit streams which correspond to the determined set of the desired and interference signal symbols.

21. The method as recited in claim 19 wherein the step of generating a replica signal of the respective received sub-carrier signal comprises the steps of:
 providing transmission channel parameters of the at least one desired signal and of the at least one interference signal;
 generating a replica signal of the at least one desired signal;
 generating a replica signal of each of the at least one interference signal; and
 combining the replica signal of the at least one desired signal and the replica signal of each of the at least one interference signal.

22. The method as recited in claim 20 wherein the step of generating sequentially a plurality of sets of desired signal symbol sequence candidates and interference signal symbol sequence candidates further comprises the steps of:
 a) storing, for the at least one desired signal and for the at least one interference signal, pre-known bit sequences as training bit sequences;

b) performing a training mode comprising the steps of:
  i) generating the desired signal complex modulation symbols which correspond to the set of training sequences;
  ii) generating the interference signals complex modulation symbols which correspond to the set of training sequences;
  iii) multiplying the desired signal complex modulation symbols with the desired signal transmission channel parameters to obtain a desired signal replica;
  iv) multiplying the interference signal complex modulation symbols with the respective interference signal transmission channel parameters to obtain respective interference signal replicas;
  v) combining the desired signal replica and the interference signal replicas to obtain a replica signal for each received sub-carrier signal;
  vi) subtracting the replica signal of the respective received sub-carrier signal from the respective received sub-carrier signal to obtain an error signal;
  vii) recursively updating the desired and interference signal transmission channel parameters using the error signal and the desired and interference signal complex modulation symbols and providing renewed desired and interference signal transmission channel parameters; and
  viii) recursively repeating the steps b) i) to b) vii) during the training mode; and
performing a tracking and information decoding mode comprising the steps:
  i) sequentially generating a plurality of bit sets of desired and interference signal candidates as a basis of a maximum likelihood estimation;
  ii) generating complex modulation symbols according to a plurality of the sets of desired and interference signals;
  iii) multiplying the desired signal complex modulation symbols by the desired signal transmission channel parameters;
  iv) multiplying the interference signal complex modulation symbols with the interference signal transmission channel parameters;
  v) combining the results of steps c) iii) and c) iv) to form a replica of a respective received sub-carrier signal;
  vi) subtracting the replica of the received signal from the respective received sub-carrier signal to form estimation error signals;
  vii) computing absolute-squared values of the estimation error signals as the metric values;
  viii) determining a most likely bit set of desired and interference signal candidates as a bit set of at least one desired signal and at least one interference signal to be transmitted by comparing a plurality of the metric values on the basis of a maximum likelihood estimation;
  ix) generating a set of desired and interference signal complex modulation symbols according to the determined bit set of desired and interference signal;
  x) estimating and/or recursively updating the transmission channel parameters of the at least one desired signal and the at least one interference signal using the determined set of desired and interference signal complex modulation symbols and the estimation error signal corresponding to the determined set of desired and interference signal complex modulation symbols; and
  xi) recursively repeating the steps c) i) to c) x) during the information data decoding mode.

23. The method as recited in claim 20 wherein the step of generating sequentially a plurality of sets of desired signal symbol sequence candidates and interference signal symbol sequence candidates further comprises the steps of:
  a) storing, for the at least one desired signal and for the at least one interference signal, pre-known bit sequences as training bit sequences;
  b) performing a training mode including the steps:
    i) generating the desired signal complex modulation symbols which correspond to the set of training sequences;
    ii) generating the interference signals complex modulation symbols which correspond to the set of training sequences; and
    iii) estimating desired and interference signal transmission channel parameters by calculating cross-correlation between the respective sub-carrier signal and said complex modulation symbol sequences of the at least one desired signal and the at least one interference signal; and
  c) performing a tracking and information decoding mode comprising the steps:
    i) sequentially generating a plurality of bit sets of desired and interference signal candidates as a basis of a maximum likelihood estimation;
    ii) generating complex modulation symbols according to a plurality of the sets of desired and interference signals;
    iii) multiplying the desired signal complex modulation symbols by the desired signal transmission channel parameters;
    iv) multiplying the interference signal complex modulation symbols with the interference signal transmission channel parameters;
    v) combining the results of steps c) iii) and c) iv) to form a replica of a respective received sub-carrier signal;
    vi) subtracting the replica of the received signal from the respective received sub-carrier signal to form estimation error signals;
    vii) computing absolute-squared values of the estimation error signals as the metric values;
    viii) determining a most likely bit set of desired and interference signal candidates as a bit set of at least one desired signal and at least one interference signal to be transmitted by comparing a plurality of the metric values on the basis of a maximum likelihood estimation;
    ix) generating a set of desired and interference signal complex modulation symbols according to the determined bit set of desired and interference signal;
    x) estimating and/or recursively updating the transmission channel parameters of the at least one desired signal and the at least one interference signal using the determined set of desired and interference signal complex modulation symbols and the estimation error signal corresponding to the determined set of desired and interference signal complex modulation symbols; and xi) recursively repeating the steps i) to x) during the information data decoding mode.

24. The method as recited in claim 19 further comprising the steps of:
   providing the at least one receiving branch with a plurality of diversity receiving branches;
   combining respective sub-carrier signals of each diversity receiving branch; and
   performing a cancelling of co-channel interference in the diversity combined sub-carrier-signals.

25. The method as recited in claim 24 wherein the generating metric values step further includes the steps of:
   separately generating metric values from each of the respective received sub-carrier signal to be diversity combined; and
   the plurality of sets of desired and interference signal symbol candidates and diversity combining the separately generated metric values.

* * * * *